(12) United States Patent
Wyatt et al.

(10) Patent No.: US 7,903,880 B2
(45) Date of Patent: Mar. 8, 2011

(54) IMAGE PROCESSING APPARATUS AND METHOD FOR DETECTING A FEATURE POINT IN AN IMAGE

(75) Inventors: Paul Wyatt, Kawasaki (JP); Hiroaki Nakai, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1091 days.

(21) Appl. No.: 11/652,501

(22) Filed: Jan. 12, 2007

(65) Prior Publication Data

US 2007/0183667 A1    Aug. 9, 2007

(30) Foreign Application Priority Data

Jan. 13, 2006    (JP) .............................. P2006-006337
Jan. 10, 2007    (JP) .............................. P2007-002341

(51) Int. Cl.
*G06K 9/48*   (2006.01)
(52) U.S. Cl. ........................................... 382/199
(58) Field of Classification Search .................. None
See application file for complete search history.

(56) References Cited

U.S. PATENT DOCUMENTS

| | | | | | |
|---|---|---|---|---|---|
| 4,410,912 | A | * | 10/1983 | Hess et al. | 348/625 |
| 5,023,919 | A | * | 6/1991 | Wataya | 382/263 |
| 5,050,227 | A | * | 9/1991 | Furusawa et al. | 382/269 |
| 5,204,747 | A | * | 4/1993 | Shinkai | 348/625 |
| 5,574,800 | A | * | 11/1996 | Inoue et al. | 382/149 |
| 5,912,715 | A | * | 6/1999 | Hanai | 348/626 |
| 6,215,527 | B1 | * | 4/2001 | Okamoto et al. | 348/625 |
| 6,636,630 | B1 | * | 10/2003 | Adachi et al. | 382/176 |
| 6,690,375 | B2 | * | 2/2004 | Ogawa et al. | 345/443 |
| 2002/0181776 | A1 | * | 12/2002 | Ikku | 382/199 |
| 2003/0007183 | A1 | * | 1/2003 | Ishiguro | 358/2.1 |
| 2003/0156233 | A1 | * | 8/2003 | Ohsumi | 349/65 |
| 2006/0077466 | A1 | * | 4/2006 | Ishii et al. | 358/3.03 |
| 2006/0078220 | A1 | * | 4/2006 | Okubo et al. | 382/261 |
| 2007/0110319 | A1 | | 5/2007 | Wyatt et al. | |

OTHER PUBLICATIONS

Takagi, M. et al., "Handbook of Image Analysis," Revised Edition, ISBN 4-13-061119-4, Chapter 5, Section 3, pp. 1228-1261, (2004).
Harris, C. et al., "A Combined Corner and Edge Detector," Proc. of the 5$^{th}$ Alrey Vision Conf., pp. 147-151, (1988).
Shi, J. et al., "Good Features to Track," IEEE Conference on Computer Vision and Pattern Recognition, (CVPR94), 8 pages, (Jun. 1994).
Felsberg, M. et al., "Image Features Based on a New Approach to 2D Rotation Invariant Quadrature Filters," European Conference on Computer Vision, ECCV 2002, pp. 369-383 (2004).

* cited by examiner

*Primary Examiner* — Brian P Werner
(74) *Attorney, Agent, or Firm* — Finnegan, Henderson, Farabow, Garrett & Dunner, L.L.P.

(57) ABSTRACT

An apparatus includes: a spatial differential value calculation unit that calculates a primary spatial differential value and a secondary spatial differential value of a brightness value with respect to each of a plurality of directions in each pixel of the image; a maximum and minimum direction estimation unit that estimates a maximum direction and a minimum direction for each pixel, the maximum direction being a direction with which the primary spatial differential value is a maximum value, the minimum direction being a direction with which the primary spatial differential value is a minimum value; and an evaluated value calculation unit that calculates a first evaluated value of each pixel using the primary spatial differential value in the maximum direction, the primary spatial differential value in the minimum direction, and the secondary spatial differential value in the maximum direction.

16 Claims, 19 Drawing Sheets

IMAGE PROCESSING APPARATUS AND METHOD FOR DETECTING A FEATURE POINT IN AN IMAGE

RELATED APPLICATION(S)

The present disclosure relates to the subject matters contained in Japanese Patent Application No. 2006-006337 filed on Jan. 13, 2006, and in Japanese Patent Application No. 2007-002341 filed on Jan. 10, 2007, which are incorporated herein by reference in its entirety.

FIELD

The present invention relates to a method for detecting feature points in an image.

BACKGROUND

There are various known methods for detecting feature points in an image based on the result of methods based on performing spatial differentiation on an image, called "Harris", "KLT" and "Structure Multivector". These methods are for superimposing one or more spatial differential filters on an image or methods using a combination of spatial differential filters, and some operation for their combination and determination of a feature point position.

These methods are described in detail in the following documents.

C. Harris and M. J. Stephens, "A Combined Corner and Edge Detector", In Alvey 88, pages 147-152, 1988

J. Shi and C. Tomasi, "Good features to track", IEEE Conference on Computer Vision and Pattern Recognition, 593-600, 1994

M. Felsberg and G. Sommer, "Image Features Based on a New Approach to 2D Rotation Invariant Quadrature Filters", European Conference on Computer Vision, 369-383, 2002.

In these methods, a feature point in an image is detected by the combination of the obtained spatial differential values. The feature points detected by these methods generally correspond to a portion (corner point) where an edge exhibits significant curvature.

The result of detection of feature points according to such prior-art methods is subject to variation due to the contrast or S/N ratio of an image. It is therefore difficult to detect feature points accurately and stably under various conditions. When, for example, the fractional noise amount differs from one image to another or from one local region of one image relative to another, it is difficult to detect feature points correctly and stably.

An optimum detection threshold value corresponding to the noise amount has to be determined manually for each image or for each local region. Thus, a large amount of labor is required for processing a large number of images.

It has therefore been desired to realize an image processing method in which feature points can be always detected accurately independently of the influence of any noise present in an image.

SUMMARY

According to an aspect of the invention, there is provided an image processing apparatus for calculating an evaluated value for detecting a feature point in an image. The apparatus includes: an image input unit for inputting an image; a spatial differential value calculation unit that calculates a primary spatial differential value of a brightness value and a secondary spatial differential value of the brightness value with respect to each of a plurality of directions in each pixel of the image; a maximum and minimum direction estimation unit that estimates a maximum direction and a minimum direction for each pixel, the maximum direction being a direction with which the primary spatial differential value is a maximum value, the minimum direction being a direction with which the primary spatial differential value is a minimum value; an evaluated value calculation unit that calculates a first evaluated value of each pixel using the primary spatial differential value in the maximum direction evaluated at the pixel, the primary spatial differential value in the minimum direction evaluated at the pixel, and the secondary spatial differential value in the maximum direction evaluated at the pixel; and an output unit that outputs the first evaluated value of each pixel.

The term "primary spatial differential value," which may also be called "Primary Spatial Derivative," is defined as a derivative in the direction in which the least squares energy is maximized; such a direction being calculable from the ratio of the response of two filters oriented orthogonally to one another and the ratio being equal to the tangent of the angle of this direction.

DETAILED DESCRIPTION OF THE EMBODIMENTS

A process for detecting feature points in an image can be regarded as a process for checking structures or features of objects in the image. In other words, the process relates to a fundamental process to find objects to be detected in the image. The feature point detection process is a fundamental image processing method available in common among industrial fields using image processing, including object detection, image pattern recognition and medical image processing. It is therefore very important to detect feature points accurately and stably under various conditions.

In order to identify and represent features of an object or a drawing in an image, edges (sides) like straight lines or turning points (corner points) of the edges may be used. A corner point is defined as an intersection of sides or a point of a side with a sufficiently large curvature, sufficiency being determined relative to the number of the desired points. If a side is assumed to be a straight line connecting corner points, features of an object can be fundamentally described only by corner points.

In order to check features of an object or a drawing in an image, a shading pattern of the image is also often used. However, by use of not the shading pattern but features expressing the shape of the object, such as sides and corner points, it is possible to obtain object features which are rarely affected by various changes in environmental and image capture variables. Corner points are very useful as feature points in an image.

Embodiments of the present invention will be described below with reference to the drawings.

First Embodiment

An image processing method according to a first embodiment of the invention will be described. The image processing method according to this embodiment is, for example, implemented as a program operating on a computer. The computer herein is not limited to a PC (Personal Computer) or a WS (Work Station) but includes, for example, an embedded processor. That is, assume that the computer includes what includes a processor for performing software processing defined by a program.

The image processing method according to this embodiment detects corner points in an image as feature points. Each corner point, for example, corresponds to an intersection of sides or a point of a side with a larger curvature than a predetermined reference value.

Figure 1:
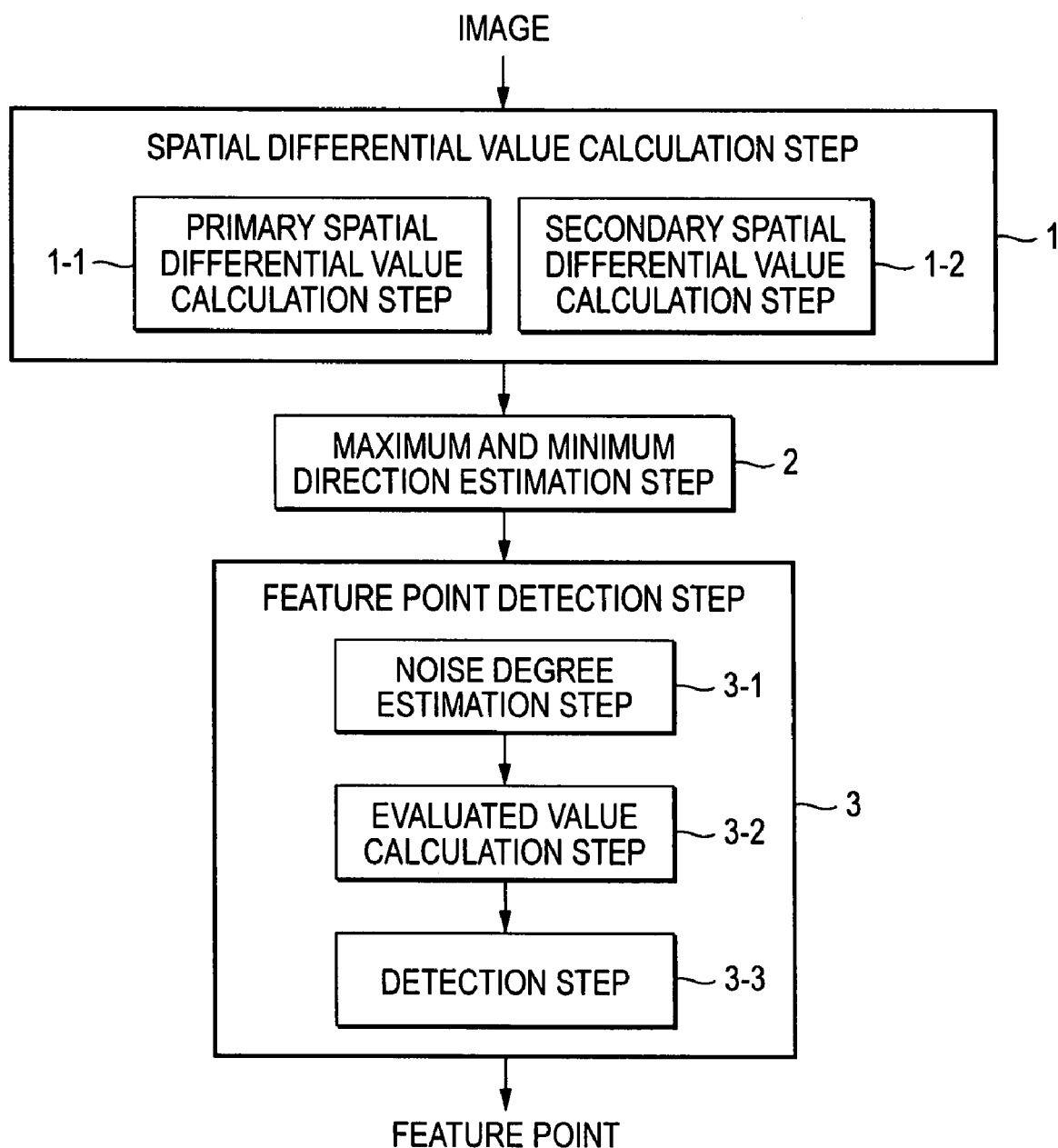
FIG. 1 is a flow chart of a feature point detection process in an image processing method according to a first embodiment of the invention.

FIG. 1 is a flow chart of a feature point detection process using the image processing method according to this embodiment. This feature point detection process includes a spatial differential value calculation step 1, a maximum and minimum direction estimation step 2, and a feature point detection step 3.

Spatial Differential Value Calculation Step 1

The spatial differential value calculation step 1 includes a primary spatial differential value calculation step 1-1 and a secondary spatial differential value calculation step 1-2. That is, in the spatial differential value calculation step 1, primary spatial differential values and secondary spatial differential values are obtained in a plurality of directions in each pixel of an image.

Figure 2:
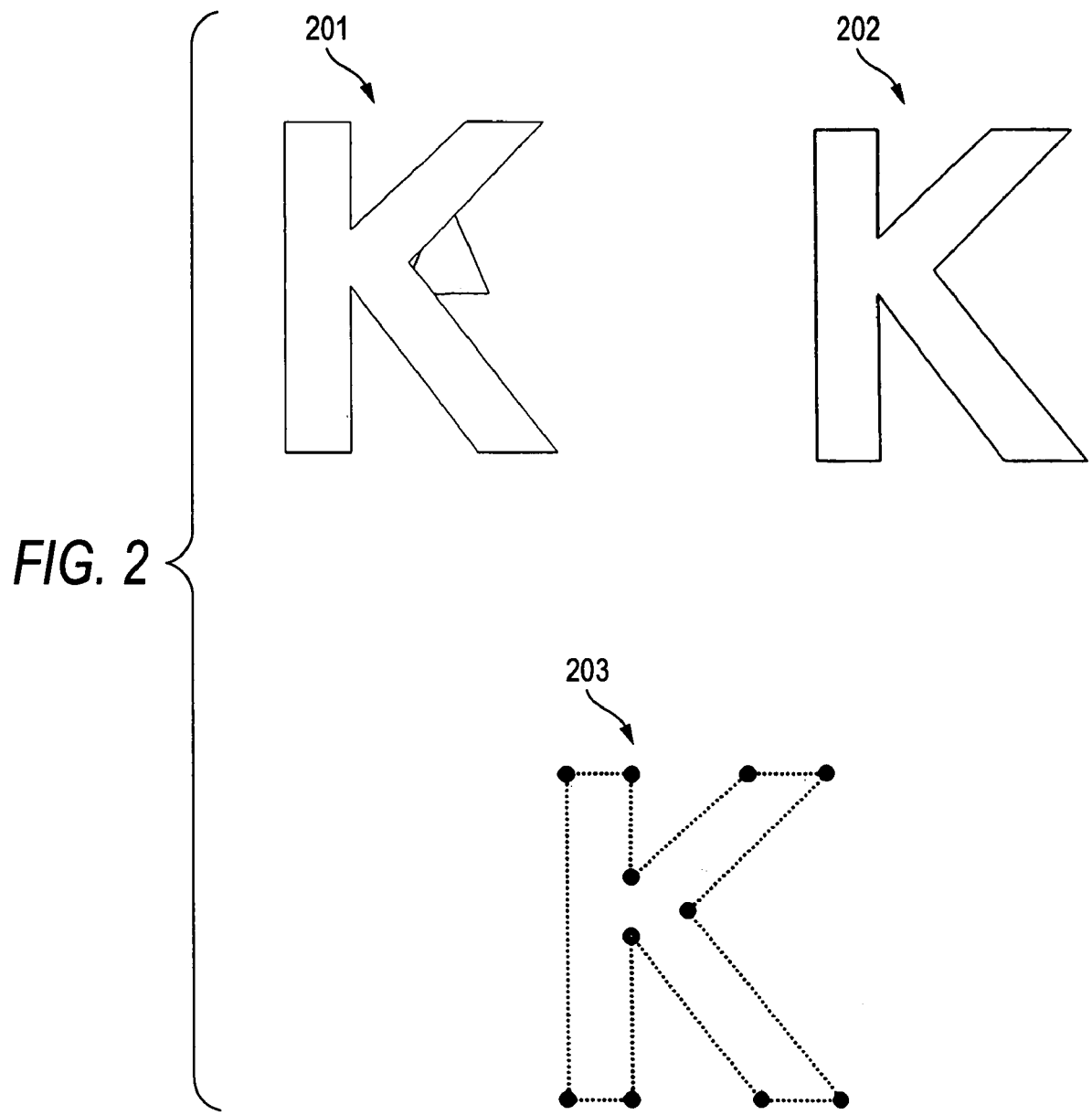
FIG. 2 is a schematic diagram showing examples of edges and feature points in an image.

First, description will be made on the primary spatial differential values and the secondary spatial differential values with reference to FIGS. 2 to 6. When edges of a graphic 201 in FIG. 2 are obtained, a figure 202 is obtained. Each edge is a boundary line dividing different regions in an image, and a portion where spatial brightness (brightness value) changes suddenly. The edges can be detected by obtaining primary spatial differential values.

Figure 3:
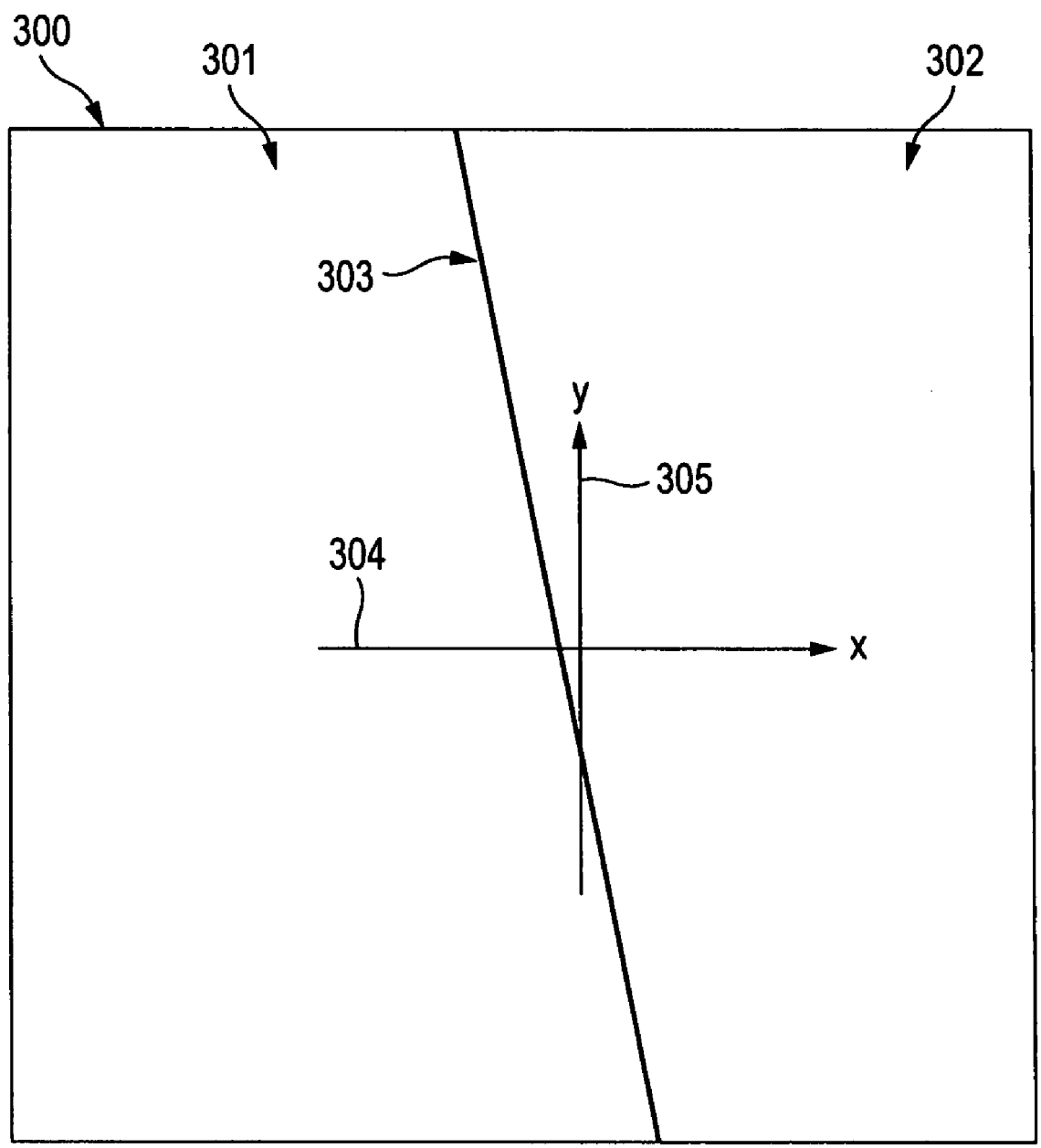
FIG. 3 is a schematic diagram showing an image where two image regions abut against each other.

FIG. 3 shows an example of an image 300 near an edge. First, in order to simplify explanation, description will be made on a spatial differentiation process in the case where an edge is shaped like a straight line. The image 300 includes a dark image region 301 and a bright image region 302 abutting against each other in a boundary 303.

Here, assume that an x-direction detection line 304 and a y-direction detection line 305 have been set on the image 300. The detection line 304 is a line extending in the x-direction from the dark image region 301 toward the bright image region 302 so as to cross the boundary 303. The detection line 305 is a line extending in the y-direction from the dark image region 301 toward the bright image region 302 so as to cross the boundary 303.

Figure 4:
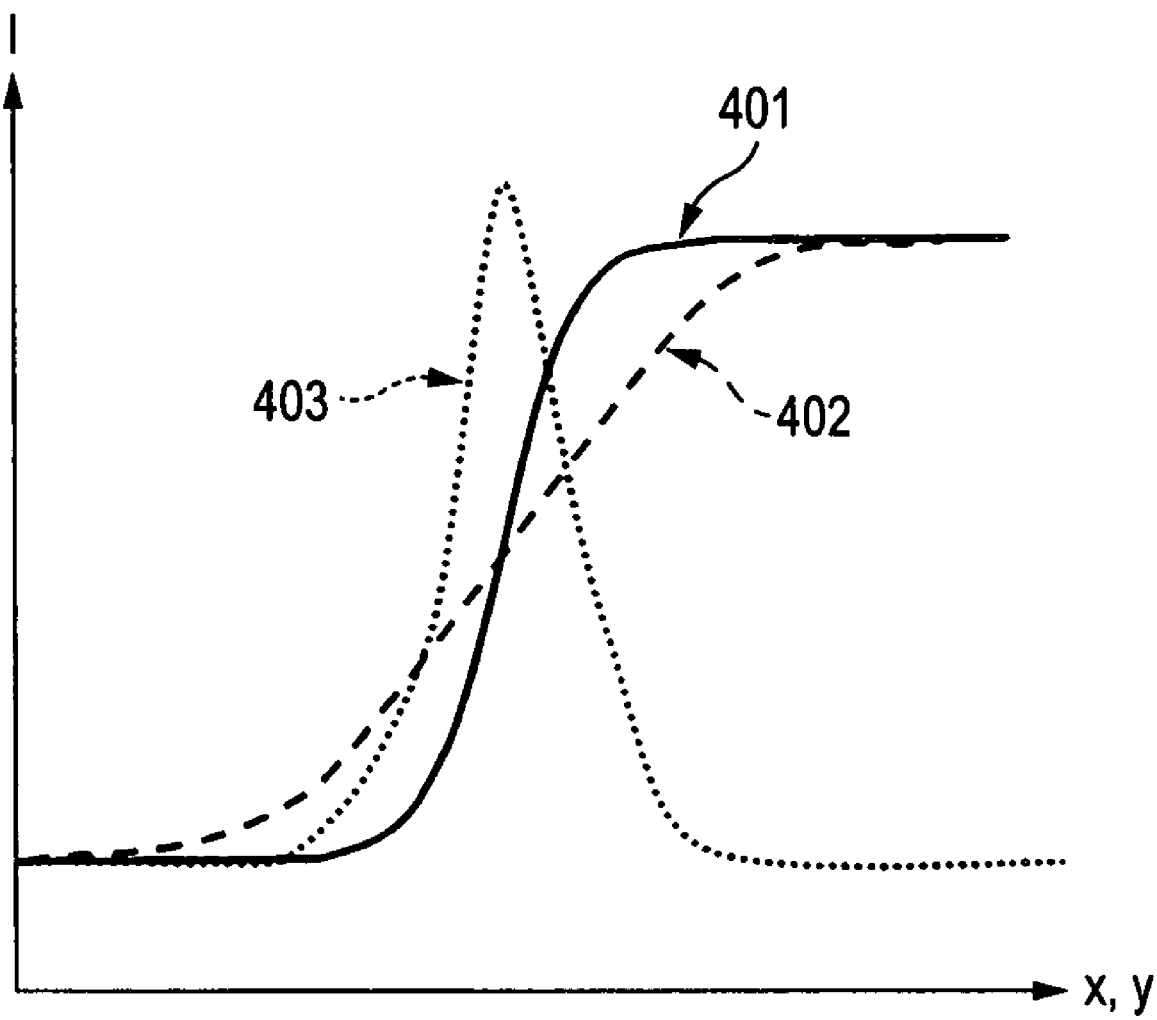
FIG. 4 is a schematic diagram showing a spatial change of a brightness value.

FIG. 4 is a graph of a brightness value I along the detection line 304. The solid line 401 designates a change in brightness along the detection line 304. The broken line 402 designates a change in brightness along the detection line 305. In FIG. 4, the brightness value I along each of the solid line 401 and the broken line 402 exhibits a low value on the left side and a high value on the right side.

Generally due to the existence of blurring and noise in the image, the brightness value I along the detection line 304 and the detection line 305 does not have an ideal step-like change. In fact the brightness value I often changes gently near the boundary 303 as shown in the solid line 401 and the broken line 402.

Figure 5:
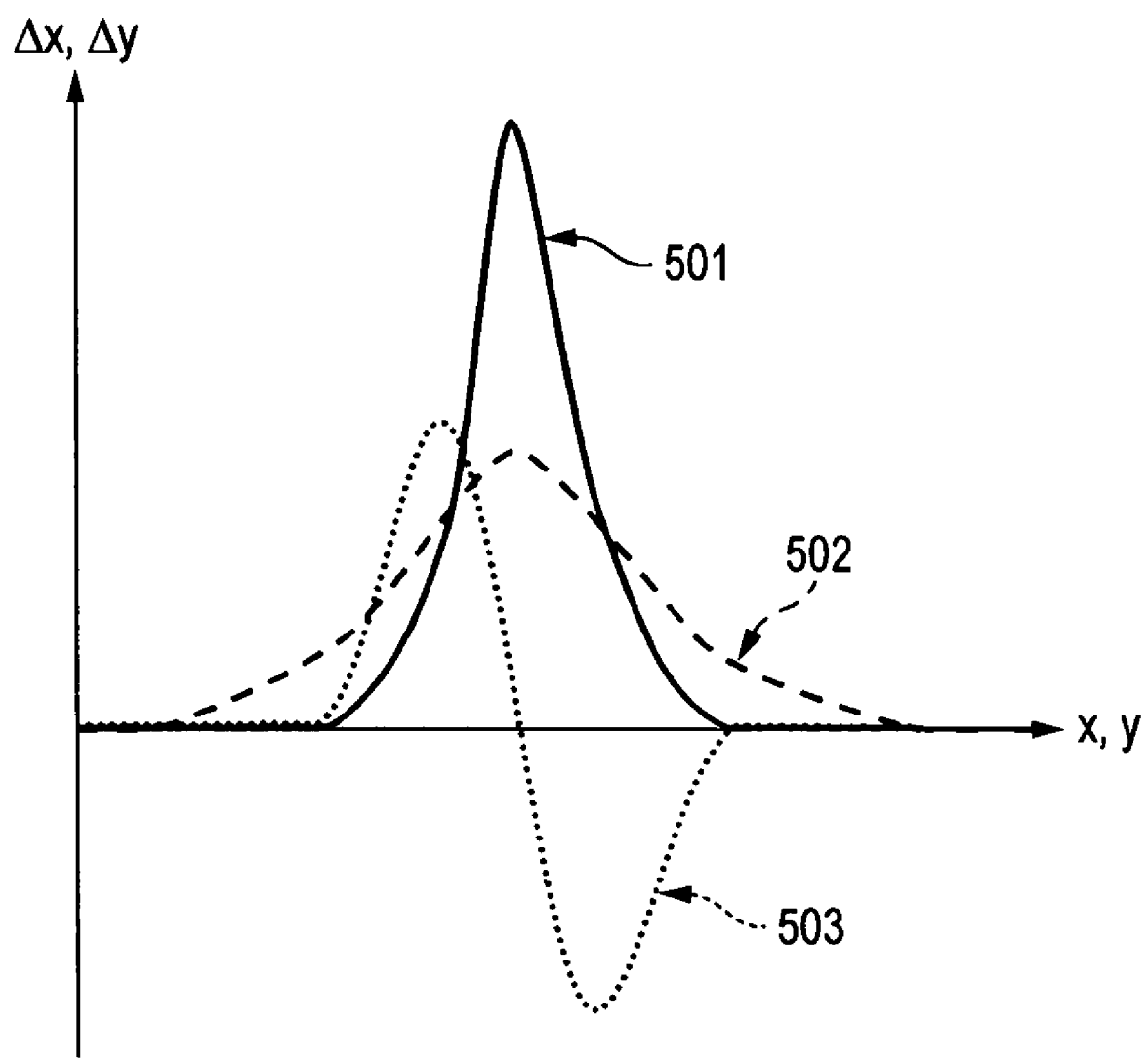
FIG. 5 is a schematic diagram showing an example of calculation of primary spatial differential values.

FIG. 5 is a graph of the primary spatial differential value of the brightness value I. The solid line 501 corresponds to the primary spatial differential value of the solid line 401. A portion showing a high differential value in the solid line 501 corresponds to a portion where the brightness value I changes suddenly in the solid line 401. The spatial differential value expressed by the solid line 501 will be referred to as an x-direction primary spatial differential value $\nabla x = \partial I/\partial x$.

The broken line 502 in FIG. 5 corresponds to the primary spatial differential value of the broken line 402. A portion showing a high differential value in the solid line 501 corresponds to a portion where the brightness value I changes suddenly in the broken line 402. The spatial differential value expressed by the broken line 502 will be referred to as a y-direction primary spatial differential value $\nabla y = \partial I/\partial y$.

In the case of FIG. 3, points high in primary spatial value are distributed along the boundary 303 between the dark image region 301 and the bright image region 302. Therefore, an edge can be detected by a spatial differentiation process obtaining connection (continuous distribution) of points where the primary spatial differential value is the maximum or the minimum, that is, the value $|\nabla x|$ or $|\nabla y|$ is the maximum.

In FIG. 5, $|\nabla y|$ is smaller than $|\nabla x|$. That is because the y-direction is closer to parallelism to the edge direction than the x-direction. Generally the absolute value of the primary spatial differential value is characterized in that it increases in a direction closer to a direction perpendicular to the edge direction, and it reaches the maximum in the direction perpendicular to the edge direction. On the contrary, the absolute value of the primary spatial differential value is characterized that it reaches the minimum in a direction parallel to the edge direction.

Figure 6:
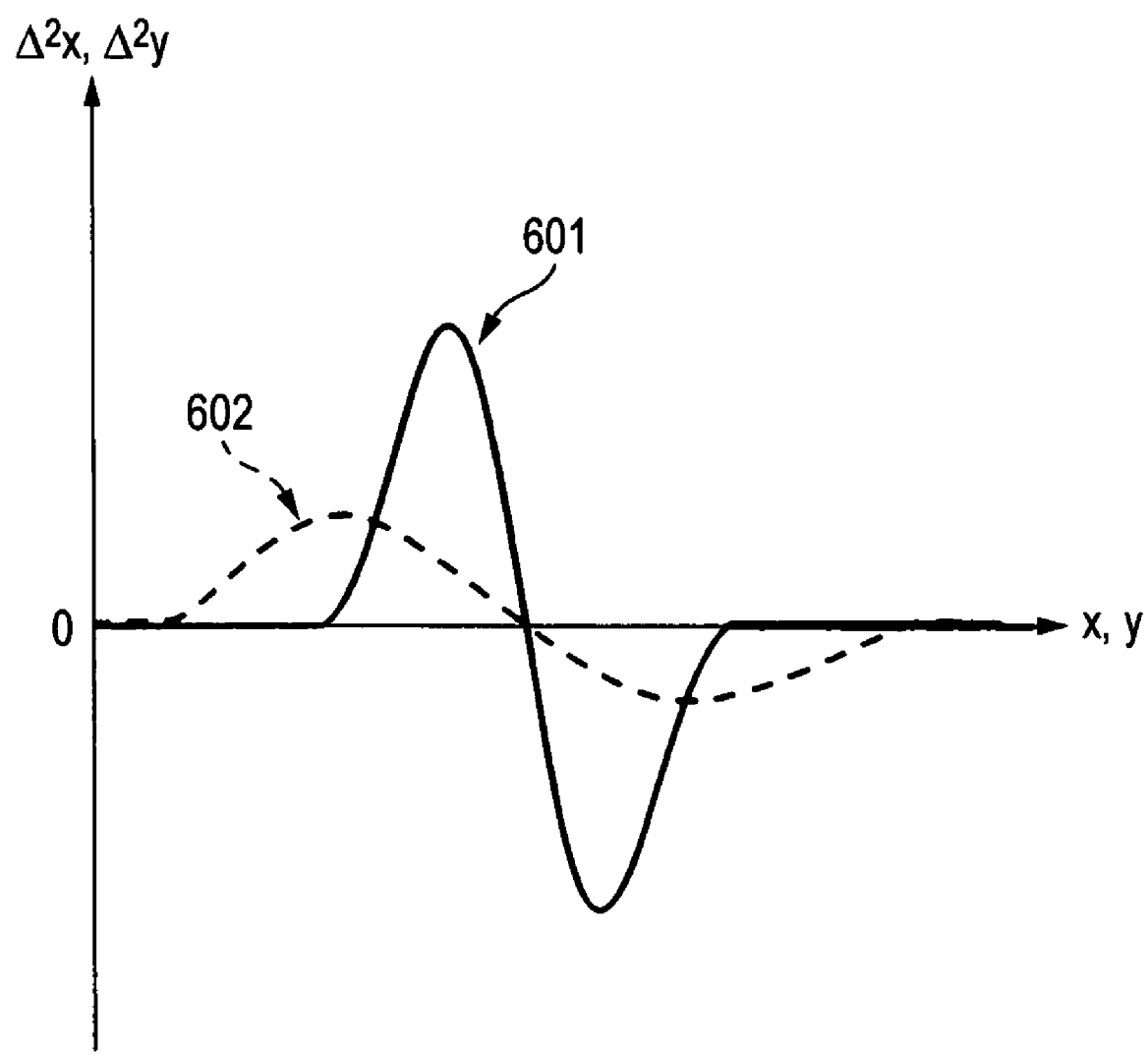
FIG. 6 is a schematic diagram showing an example of calculation of secondary spatial differential values.

FIG. 6 is a graph of a secondary spatial differential value of the brightness value I, that is, a graph of a value obtained by further differentiating the primary spatial differential value. The solid line 601 designates the differential value of the solid line 501 and corresponds to the secondary spatial differential value of the solid line 401. A portion where the solid line 601 crosses the x-axis is a portion where the solid line 501 reaches the maximum or the minimum. The portion corresponds to the portion where the brightness value I changes suddenly in the solid line 401. The spatial differential value expressed by the solid line 601 will be referred to as an x-direction secondary spatial differential value $\nabla^2 x = \partial^2 I/\partial x^2$.

The broken line 602 in FIG. 6 designates the differential value of the broken line 502 and corresponds to the secondary spatial differential value of the broken line 402. A portion where the broken line 602 crosses the y-axis is a portion where the broken line 502 reaches the maximum or the minimum. The portion corresponds to the portion where the brightness value I changes suddenly in the broken line 402. The spatial differential value expressed by the broken line 602 will be referred to as a y-direction secondary spatial differential value $\nabla^2 y = \partial^2 I/\partial y^2$.

In the case of FIG. 3, points where the secondary spatial value crosses the x-axis or the y-axis are distributed along the boundary 303 between the dark image region 301 and the bright image region 302. Therefore, an edge can be detected by a spatial differentiation process obtaining connection (continuous distribution) of points where the secondary spatial differential value crosses the axis.

Maximum and Minimum Direction Estimation Step 2

In the maximum and minimum direction estimation step 2, the direction where the primary spatial differential value of each pixel reaches the maximum and the direction where the primary spatial differential value of each pixel reaches the minimum are estimated.

Not only straight lines but also points with significant or large curvature, that is, corner points 203 are present in the edge. In the following description, it is assumed that such a corner point is classified as a feature point, and detected.

Figure 7:
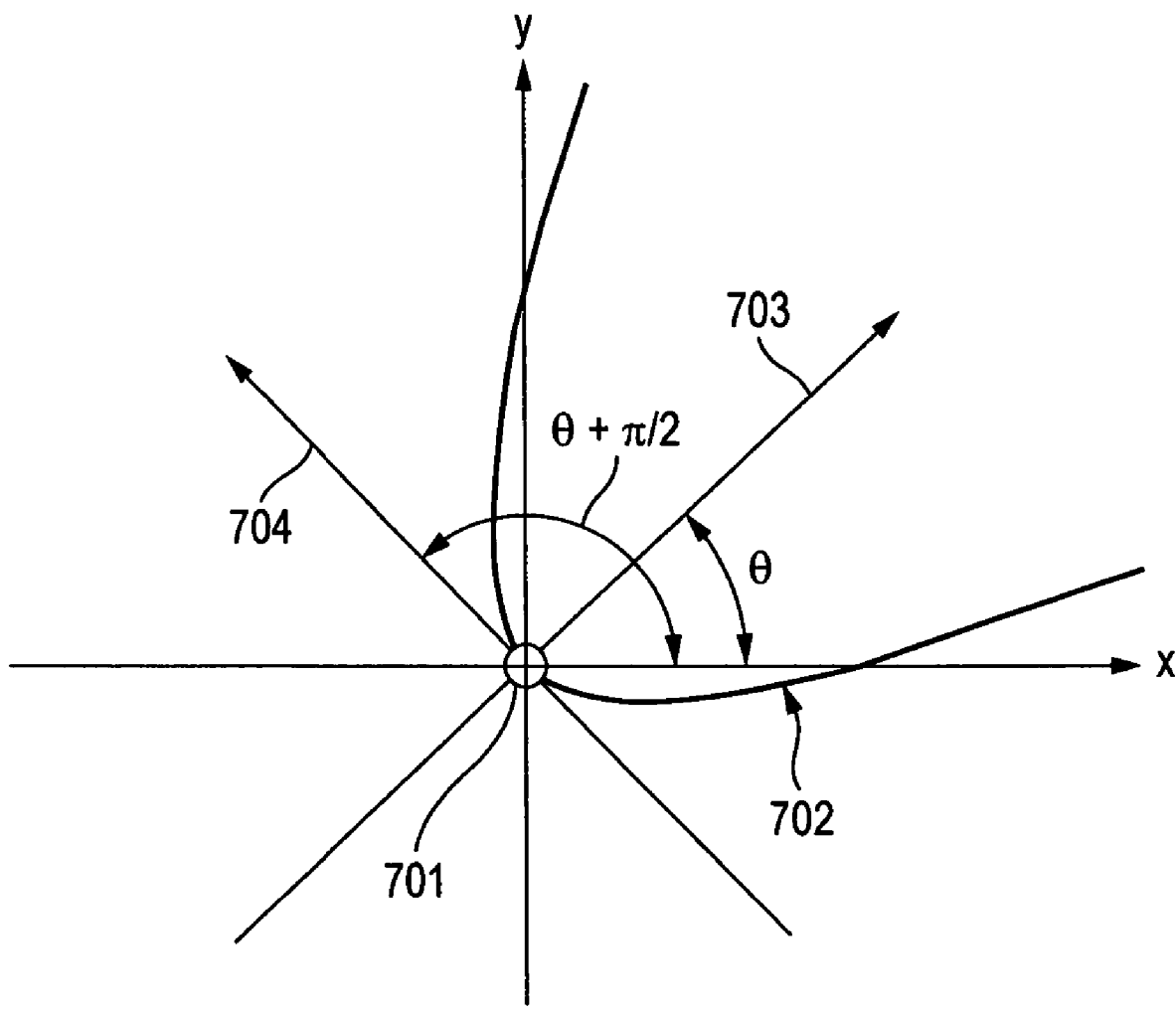
FIG. 7 is a schematic diagram showing an edge and a feature point direction near a feature point.

In FIG. 7, assume that a target pixel 701 is a feature point (corner point). In this case, an edge 702 passing this point is present, and the edge 702 has a large curvature in the pixel 701. A direction passing the pixel 701 and serving as an axis with respect to which the edge 702 is symmetrical will be referred to as feature point direction θ. The feature point direction θ is a direction measured in a clockwise direction, having angle θ with respect to the x-direction. In FIG. 7, a detection line 703 extends in the direction θ in the same manner as the feature point direction θ. A direction perpendicular to the feature point direction θ will be referred to as the "direction perpendicular to the feature point direction" (θ+π/2). The direction (θ+π/2) perpendicular to the feature point direction is a direction obtained from θ by a counterclockwise rotation of π/2 radians, which is angle (θ+π/2) with respect to the x-direction. In FIG. 7, a detection line 704 extends in the direction (θ+π/2).

The feature point direction (θ+π/2) is the direction perpendicular, or nearly perpendicular, to the edge direction θ. Therefore, as described above, the absolute value $|\nabla\theta|=|\partial I/\partial\theta|$ of the primary spatial differential value in the direction θ is the maximum with respect to θ. On the other hand, the absolute value $|\nabla^2\theta|=|\partial^2 I/\partial\theta^2|$ of the secondary spatial differential value is a value close to 0 because the point is present on the edge.

Likewise, the direction (θ+π/2) perpendicular to the feature point direction is a direction substantially parallel to the edge direction. Therefore, as described above, the absolute value $|\nabla(\theta+\pi/2)|=|\partial I/\partial(\theta+\pi/2)|$ of the primary spatial differential value in the direction (θ+π/2) is the minimum with respect to θ. This is also shown by the broken line 403 in FIG. 4 and the broken line 503 in FIG. 5. The distribution of the brightness value I in the direction (θ+π/2) near the pixel 701 is shown by the broken line 403 in FIG. 4. The broken line 403 reaches the maximum in the position of the pixel 701. The broken line 503 in FIG. 5 shows the differential value of the broken line 403. The broken line 503 crosses the abscissa in the position of the pixel 701 and reaches a level approaching, or which may be considered equivalent to, zero.

Figure 8:
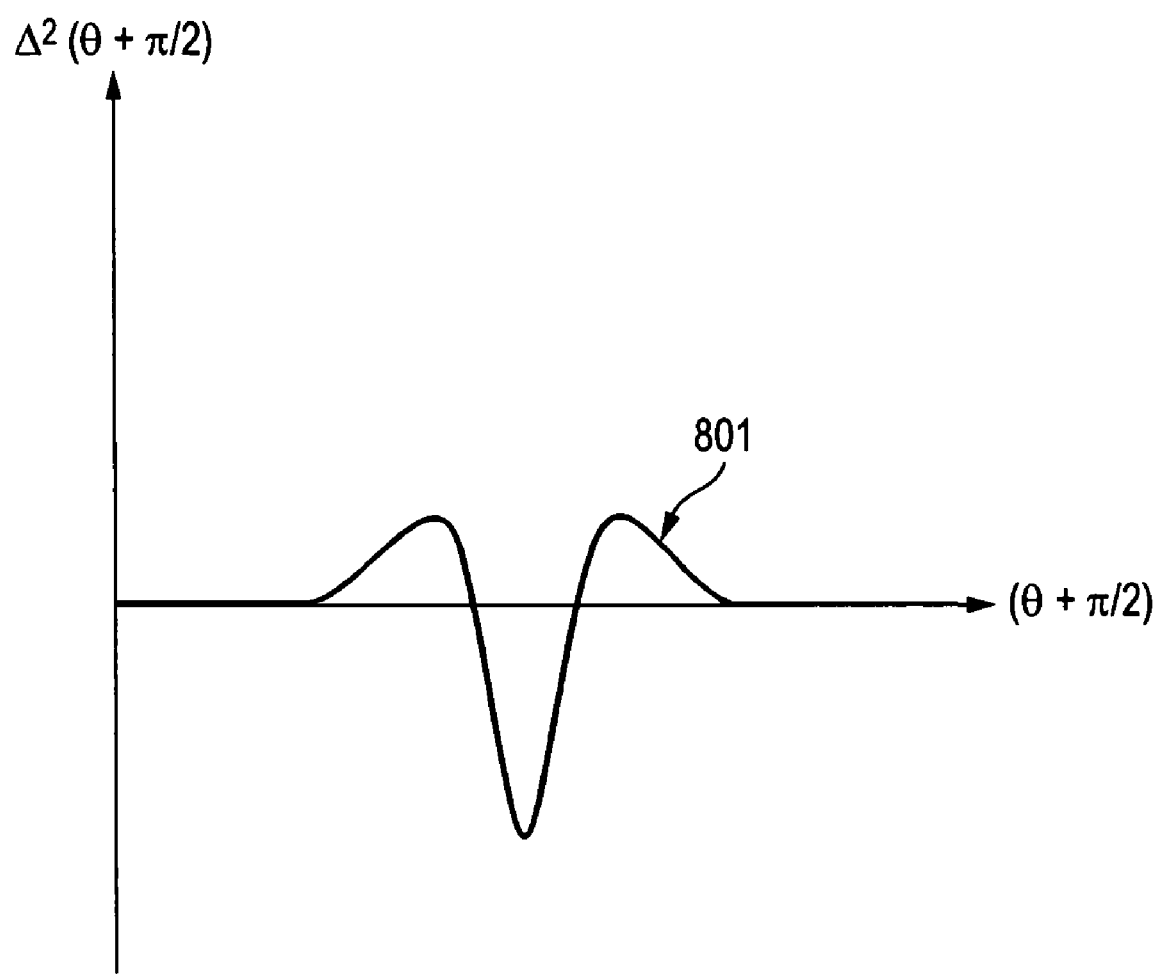
FIG. 8 is a schematic diagram showing secondary spatial differential values in directions perpendicular to the feature point direction.

The solid line 801 in FIG. 8 designates the secondary spatial differential value $\nabla^2(\theta+\pi/2)=\partial^2 I/\partial(\theta+\pi/2)^2$ in the direction (θ+π/2). The value $|\nabla^2(\theta+\pi/2)|$ reaches its maximum at the point where the broken line 403 reaches its maximum, that is, in the pixel 701.

In this embodiment, in the spatial differential value calculation step 1, primary spatial differential values and secondary spatial differential values in a plurality of directions are obtained for each point of an image. Then, in the maximum and minimum direction estimation step 2, a direction (feature point direction) where the absolute value of the primary spatial differential value reaches the maximum is obtained, and a direction (direction perpendicular to the feature point direction) where the absolute value of the primary spatial differential value reaches the minimum is also obtained.

To this end, the absolute value $|\nabla\theta|$ of the primary spatial differential value in the maximum direction and the absolute value $|\nabla(\theta+\pi/2)|$ of the primary spatial differential value in the minimum direction are obtained, and the absolute values $|\nabla^2\theta|$ and $|\nabla^2(\theta+\pi/2)|$ of the secondary spatial differential values in the same directions as the aforementioned maximum and minimum directions are obtained.

Modification 1-1

The absolute value of the primary spatial differential value in a direction perpendicular to the direction where the absolute value of the primary spatial differential value reaches the maximum may be used as the minimum $|\nabla(\theta+\pi/2)|$ of the absolute values of the primary spatial differential values.

That is, of the absolute values of the primary spatial differential values in the plurality of directions, the maximum $|\nabla\theta|$ is obtained. The absolute value of the primary spatial differential value in the direction perpendicular to the direction where the absolute value of the primary spatial differential value reaches the maximum may be regarded as the minimum $|\nabla(\theta+\pi/2)|$ of the absolute values of the primary spatial differential values.

Modification 1-2

The absolute value of the primary spatial differential value in a direction perpendicular to the direction where the absolute value of the primary spatial differential value reaches the minimum may be used as the maximum $|\nabla\theta|$ of the absolute values of the primary spatial differential values.

That is, of the absolute values of the primary spatial differential values in the plurality of directions, the minimum $|\nabla(\theta+\pi/2)|$ is obtained. The absolute value of the primary spatial differential value in the direction perpendicular to the direction where the absolute value of the primary spatial differential value reaches the maximum may be regarded as the maximum $|\nabla\theta|$ of the absolute values of the primary spatial differential values.

Modification 1-3

The spatial differential value calculation step 1 in this embodiment has been described on the assumption that the brightness value in an image changes continuously spatially. In fact, however, the image is composed of a plurality of pixels. Thus, the image is spatially quantized. Now imagine only a region of 3×3 pixels around a target pixel in the image.

Figure 9:
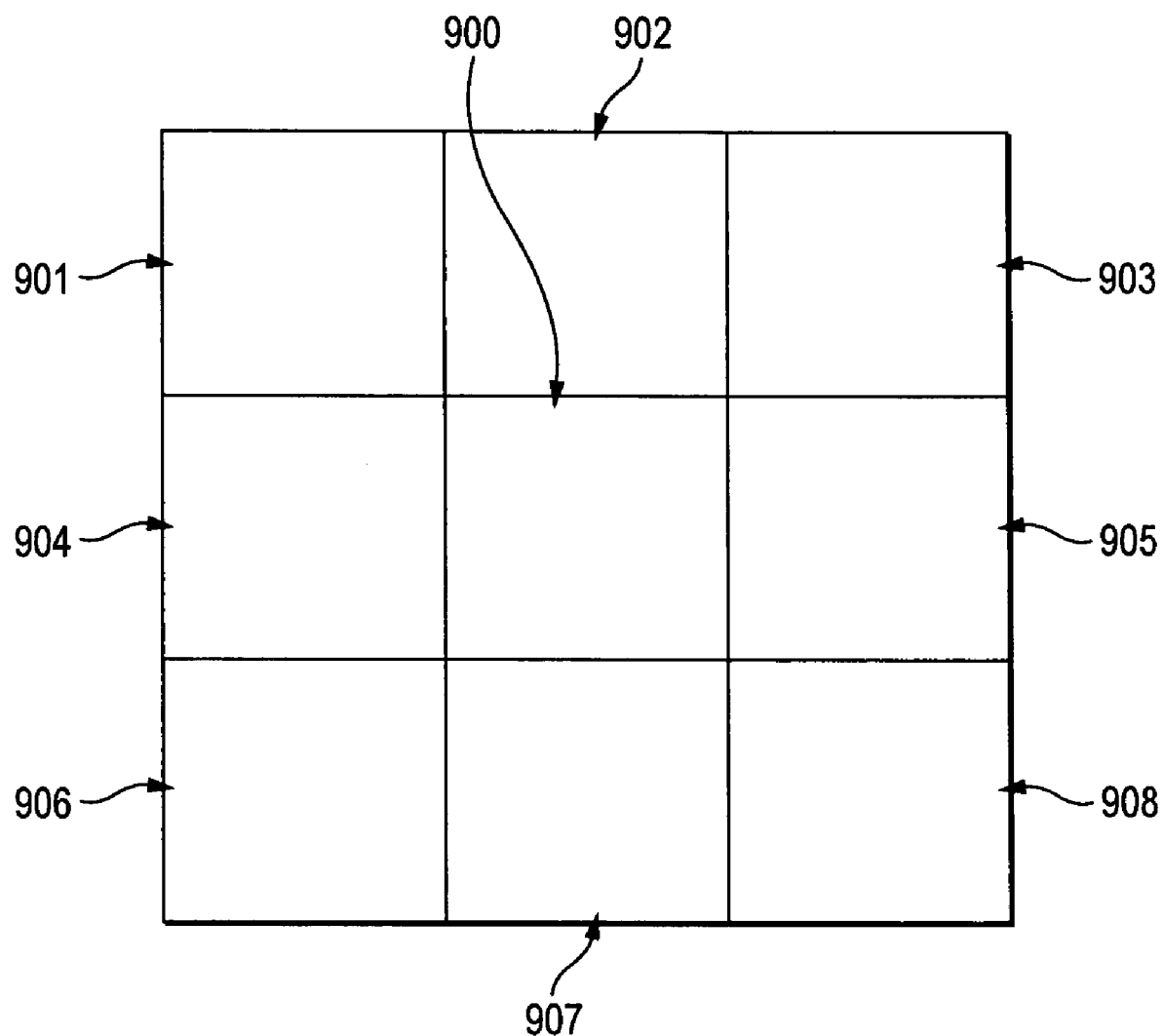
FIG. 9 is a schematic diagram showing a local image region with quantized pixels.

As shown in FIG. 9, eight pixels 901 to 908 are present around a target pixel 900. Each pixel has a positional relationship with the pixel 900 as follows:

| | | |
|---|---|---|
| upper left pixel 901 | upper pixel 902 | upper right pixel 903 |
| left pixel 904 | | right pixel 905 |
| lower left pixel 906 | lower pixel 907 | lower right pixel 908 |

Figure 10:
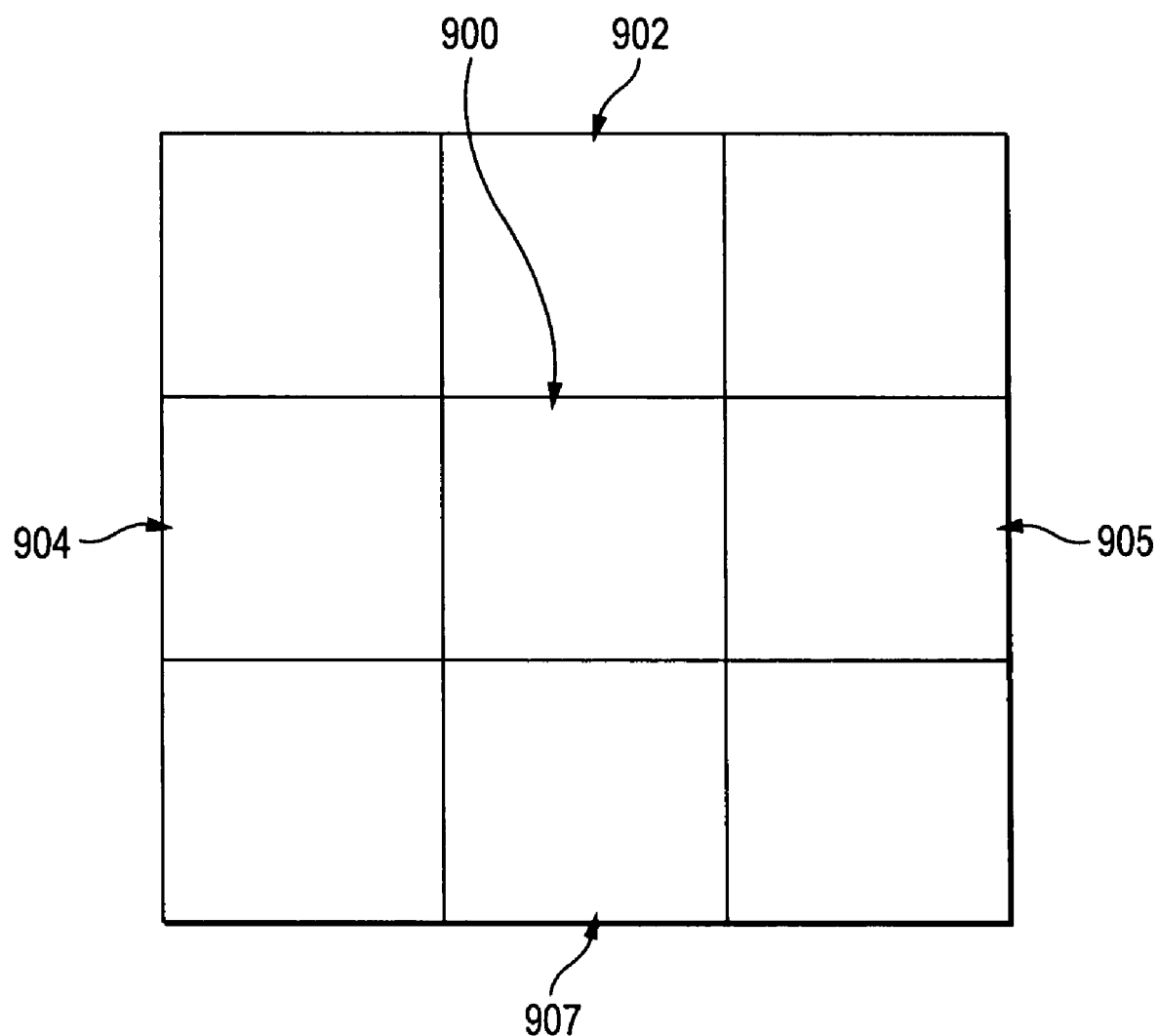
FIG. 10 is a schematic diagram showing an edge direction in the local image region.
Figure 11:
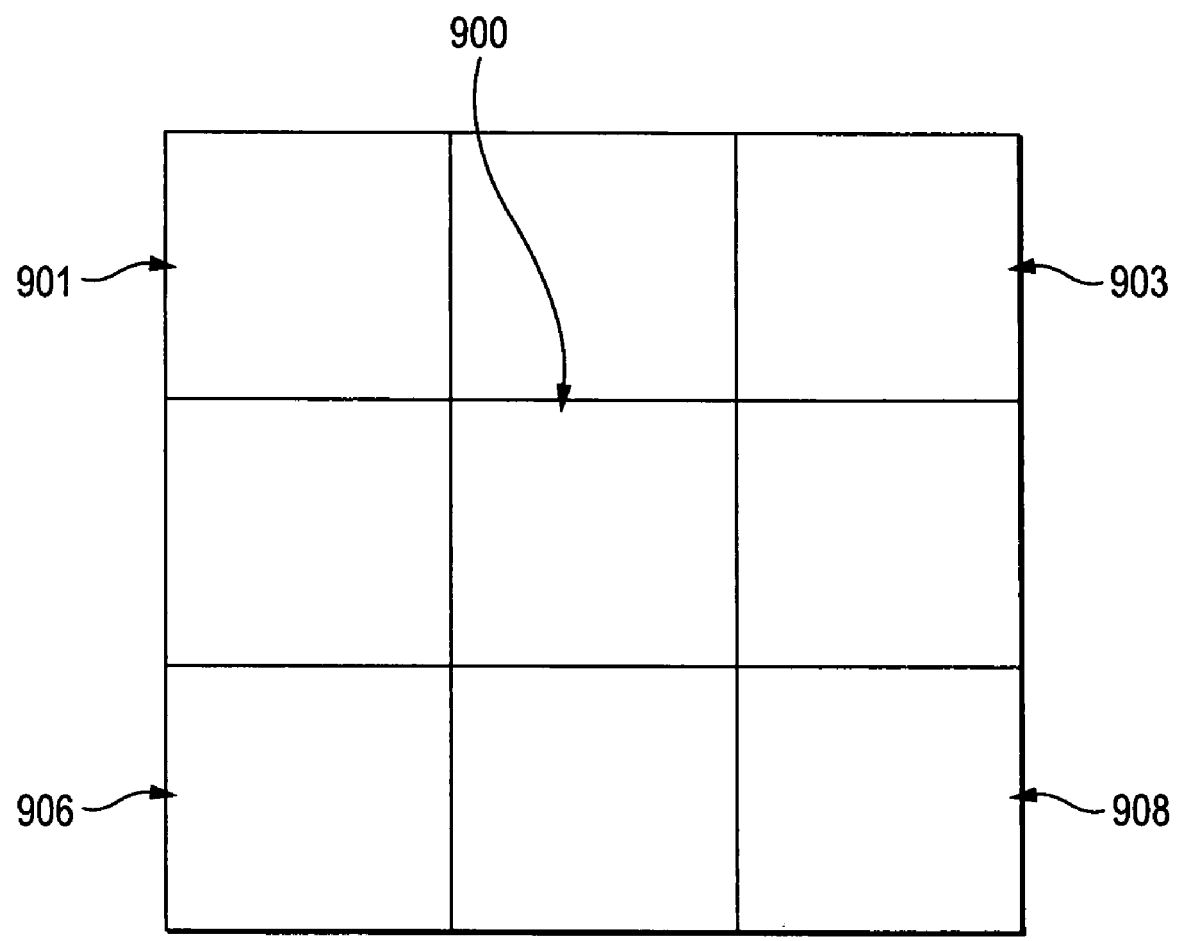
FIG. 11 is a schematic diagram showing an edge direction in the local image region.
Figure 12:
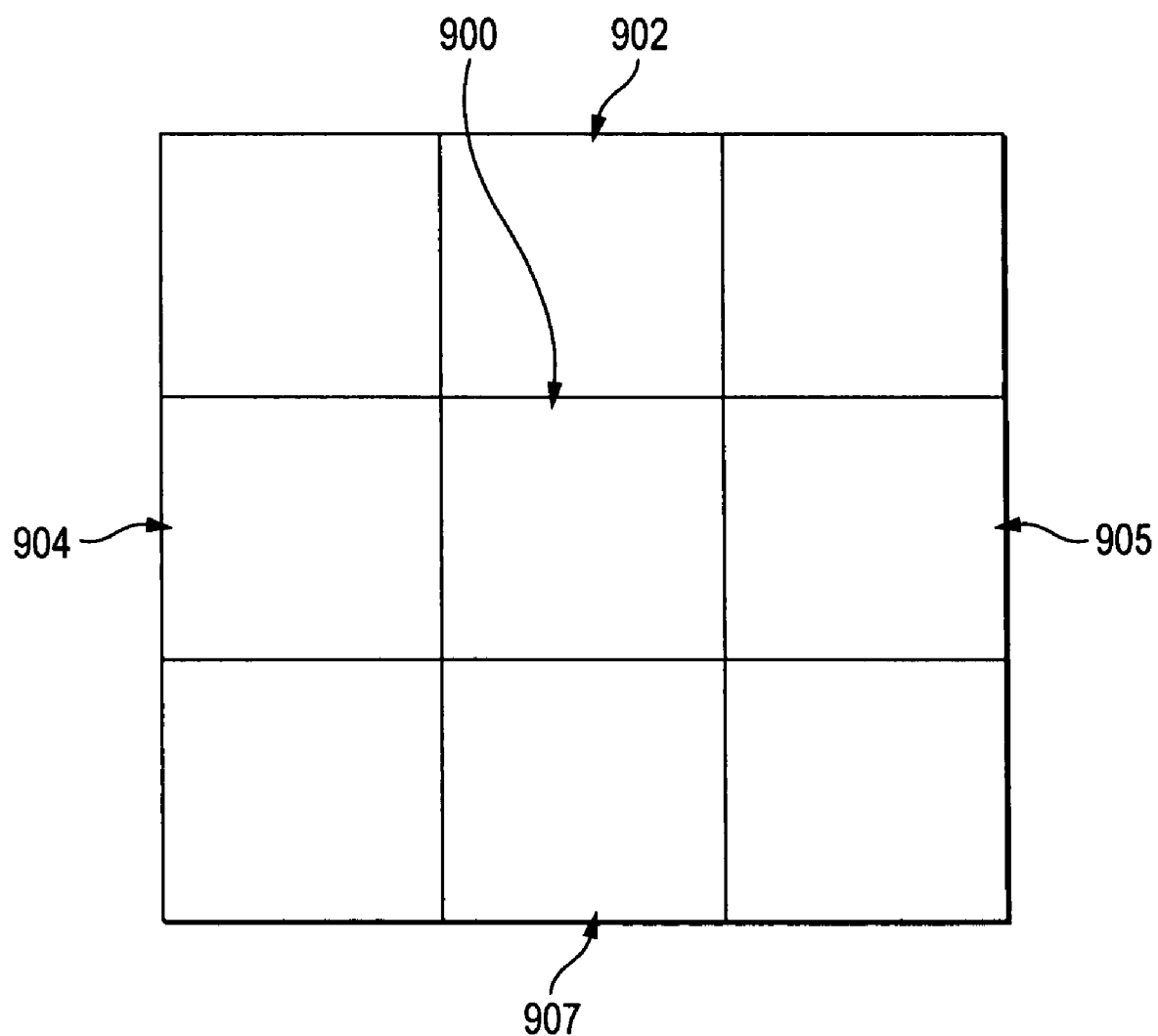
FIG. 12 is a schematic diagram showing an edge direction in the local image region.
Figure 13:
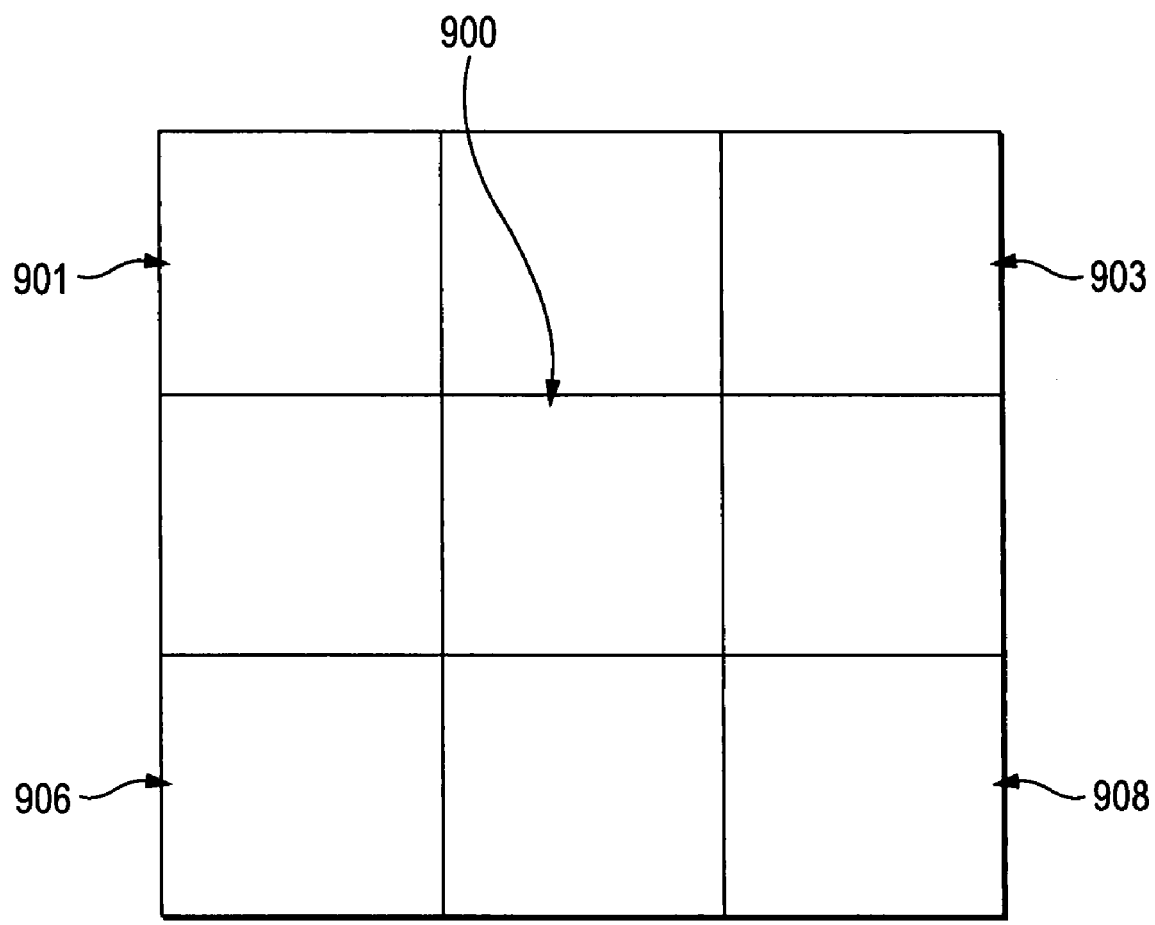
FIG. 13 is a schematic diagram showing an edge direction in the local image region.

Assume that the pixel 900 is a feature point in the imagined local region of the 3×3 pixels in the image. In this case, only four directions shown in FIGS. 10-13 may be assumed as feature point directions. Specifically:

FIG. 10 pixel 904→pixel 900→pixel 905;
FIG. 11 pixel 901→pixel 900→pixel 908;
FIG. 12 pixel 902→pixel 900→pixel 907; and
FIG. 13 pixel 903→pixel 900→pixel 906.

Therefore, primary spatial differential values and secondary spatial differential values to be obtained may be obtained in the feature point directions:

FIG. 10 pixel 904→pixel 900→pixel 905;
FIG. 11 pixel 901→pixel 900→pixel 908;
FIG. 12 pixel 902→pixel 900→pixel 907; and
FIG. 13 pixel 903→pixel 900→pixel 906, and in directions perpendicular to the feature point directions:

FIG. 10 pixel 902→pixel 900→pixel 907;
FIG. 11 pixel 903→pixel 900→pixel 906;
FIG. 12 pixel 904→pixel 900→pixel 905; and
FIG. 13 pixel 901→pixel 900→pixel 908.

In calculation of the primary spatial differential values, primary partial differentiation such as $\partial I/\partial x$ can be replaced by difference of pixel values. Specifically, when the brightness value of each pixel $90k$ (k=0, ..., 8) is $I_{90k}$, four values may be obtained in the following Expression (1).

$$\left.\begin{array}{l} |I_{904} - I_{905}| \\ |I_{901} - I_{908}| \\ |I_{902} - I_{907}| \\ |I_{903} - I_{906}| \end{array}\right\} \quad (1)$$

In calculation of the secondary spatial differential values, secondary partial differentiation such as $\partial^2 I/\partial x^2$ can be replaced by difference of pixel values. Specifically, when the brightness value of each pixel $90k$ (k=0, ..., 8) is $I_{90k}$, four values may be obtained in the following Expression (2).

$$\left.\begin{array}{l} |-I_{904} + 2I_{900} - I_{905}| \\ |-I_{901} + 2I_{900} - I_{908}| \\ |-I_{902} + 2I_{900} - I_{907}| \\ |-I_{903} + 2I_{900} - I_{906}| \end{array}\right\} \quad (2)$$

The method for obtaining primary spatial differential values and secondary spatial differential values in such an image with quantized pixels is not limited to calculation of brightness values among pixels lying on a straight line as described above. Any spatial differential operation method such as Sobel, Roberts, Robinson, Prewitt, Kirsch, Lapracian, Canny, Gabor, etc. generally known well may be used as spatial differential operation. Special examples are described in detail in "Handbook of Image Analysis, Revised Edition", Takagi and Shimoda, University of Tokyo Press (ISBN 4-13-061119-4). The primary spatial differential values are obtained with respect to the aforementioned four directions. Based on the maximum or the minimum of the primary spatial differential values, a feature point direction (direction θ) and a direction (direction (θ+π/2)) perpendicular to the feature point direction can be determined, and absolute values of primary spatial differential values and secondary spatial differential values in the determined directions can be set as $|\nabla\theta|$, $|\nabla(\theta+\pi/2)|$, $|\nabla^2\theta|$ and $|\nabla^2(\theta+\pi/2)|$.

Although any filters can be used theoretically, the optimum is obtained with specific types of filters. For optimal calculation of the gradients, the filters applied to the image should be such as to calculate an anisotropic response in the sense that an anisotropic filter is radially band limited. The radially cutoff should be angled to 45 degrees either side of the estimated direction to effectively split the received signal into a response in the primary direction θ and a response in the secondary direction (θ+π/2). This division of the radial response strongly relates to the distinction between different types of structures on which the method is based. Typically isotropic filters, in the sense that a pair split the angular domain and hence the response in any angular direction can be obtained from combination of their individual responses, are used for filter calculations. However, they are suboptimal as in directions excepting those aligned with the principal axes they gradually lose the ability to distinguish between an edge and a corner. Anisotropic filters avoid this problem to the limit allowed by the resolution of the image.

Feature Point Detection Step 3

The feature point detection step 3 includes a noise degree estimation step 3-1 for estimating the noise amount in each pixel, an evaluated value calculation step 3-2 for calculating feature point intensity as an evaluated value expressing likelihood of the feature point of each pixel, and a detection step 3-3 for detecting a feature point in the image based on the feature point intensity of each pixel.

In the feature point detection step 3, feature point intensity of a desired point or pixel in the image is calculated using the feature point direction θ obtained in the maximum and minimum direction estimation step 2, the absolute value $|\nabla\theta|$ of the primary spatial differential value in the feature point direction θ, the absolute value $|\nabla^2\theta|$ of the secondary spatial differential value in the feature point direction θ, the direction (θ+π/2) perpendicular to the feature point direction, the absolute value $|\nabla(\theta+\pi/2)|$ of the primary spatial differential value in the direction (θ+π/2) perpendicular to the feature point direction, θ, and the absolute value $|\nabla^2(\theta+\pi/2)|$ of the secondary spatial differential value in the direction (θ+π/2) perpendicular to the feature point direction. The feature point intensity is an evaluated value expressing the likelihood that a feature point exists at that spatial point. The feature point intensity in this embodiment corresponds to a probability of existence of an edge. When there is a spatial change in brightness value caused by a feature point, the primary spatial differential value $|\nabla\theta|$ in the feature point direction has a significant value. An image generally has noise. Therefore, a spatial differential value caused by the noise is also included in the primary spatial differential value.

The primary spatial differential value $|\nabla(\theta+\pi/2)|$ in the direction perpendicular to the feature point direction is a spatial differential value in a direction parallel to the edge direction. It is therefore possible to assume that the primary spatial differential value $|\nabla(\theta+\pi/2)|$ does not include a spatial differential value caused by the change in brightness value caused by the edge at the feature point but includes only a spatial differential value caused by noise.

On the other hand, the secondary spatial differential value $|\nabla^2(\theta+\pi/2)|$ in the direction perpendicular to the feature point direction is a value increasing with the increase of the curvature of the edge in the feature point. On the contrary, the secondary spatial differential value $|\nabla^2(\theta+\pi/2)|$ approaches zero when the curvature is so small that the edge is close to a straight line. From this, it is necessary to obtain the feature point intensity in consideration of $|\nabla^2(\theta+\pi/2)|$ when an edge close to a straight line is not detected as a feature point but a corner point, which is a point having large curvature, is detected as a feature point. In addition, it is possible to assume that the secondary spatial differential value $|\nabla^2(\theta+\pi/2)|$ in the feature point direction does not include a spatial differential value caused by the change in brightness value caused by the edge component of the feature point but includes only a spatial differential value caused by noise.

Thus, feature point intensity P can be obtained by Expression (3) using an estimated noise amount σ and a constant α.

$$\sigma = E[|\nabla(\theta + \frac{\pi}{2})|]$$ (3)

$$P = \frac{\lfloor|\nabla\theta| - \alpha\sigma\rfloor\lfloor|\nabla^2(\theta + \frac{\pi}{2})| - \alpha\sigma\rfloor}{|\nabla\theta||\nabla^2(\theta + \frac{\pi}{2})|}$$

where $$\lfloor X \rfloor = \begin{cases} 0 & (X \leq 0) \\ X & (X > 0) \end{cases}$$

That is, the feature point intensity P can be obtained as a value normalized by the primary spatial differential value and the secondary spatial differential value while subtracting the noise amount from both the primary spatial differential value caused by the edge intensity in the feature point and the secondary spatial differential value caused by the edge curvature in the feature point. That is, the feature point intensity P can be obtained as, and said to be equivalent to, a feature point existence probability.

Here, the constant α is a desired constant, which may be set as 1 or another desired value. The influence of the estimated noise amount σ is adjusted by the constant α in Expression (3). However, the influence on the edge intensity P may be taken into consideration in the stage where the estimated noise amount σ is obtained. For example, what corresponds to α×σ in Expression (3) may be obtained as the estimated noise amount. The aforementioned Expression (3) shows an example where the absolute value |∇(θ+π/2)| of the primary spatial differential value in the direction perpendicular to the feature point direction is used as the estimated noise amount σ as it is. However, the estimated noise amount σ is not limited to this. The estimated noise amount can be assumed to be uniform within a local region around each pixel. Thus, when a local region R having an area "s" is set, the estimated noise amount σ may be obtained as an average value by Expression (4).

$$\sigma = \sqrt{\frac{1}{s}\sum_R (\nabla(\theta + \frac{\pi}{2}))}$$ (4)

Figure 14:
FIG. 14 is a result of a feature point detection process in a related-art method.
Figure 15:
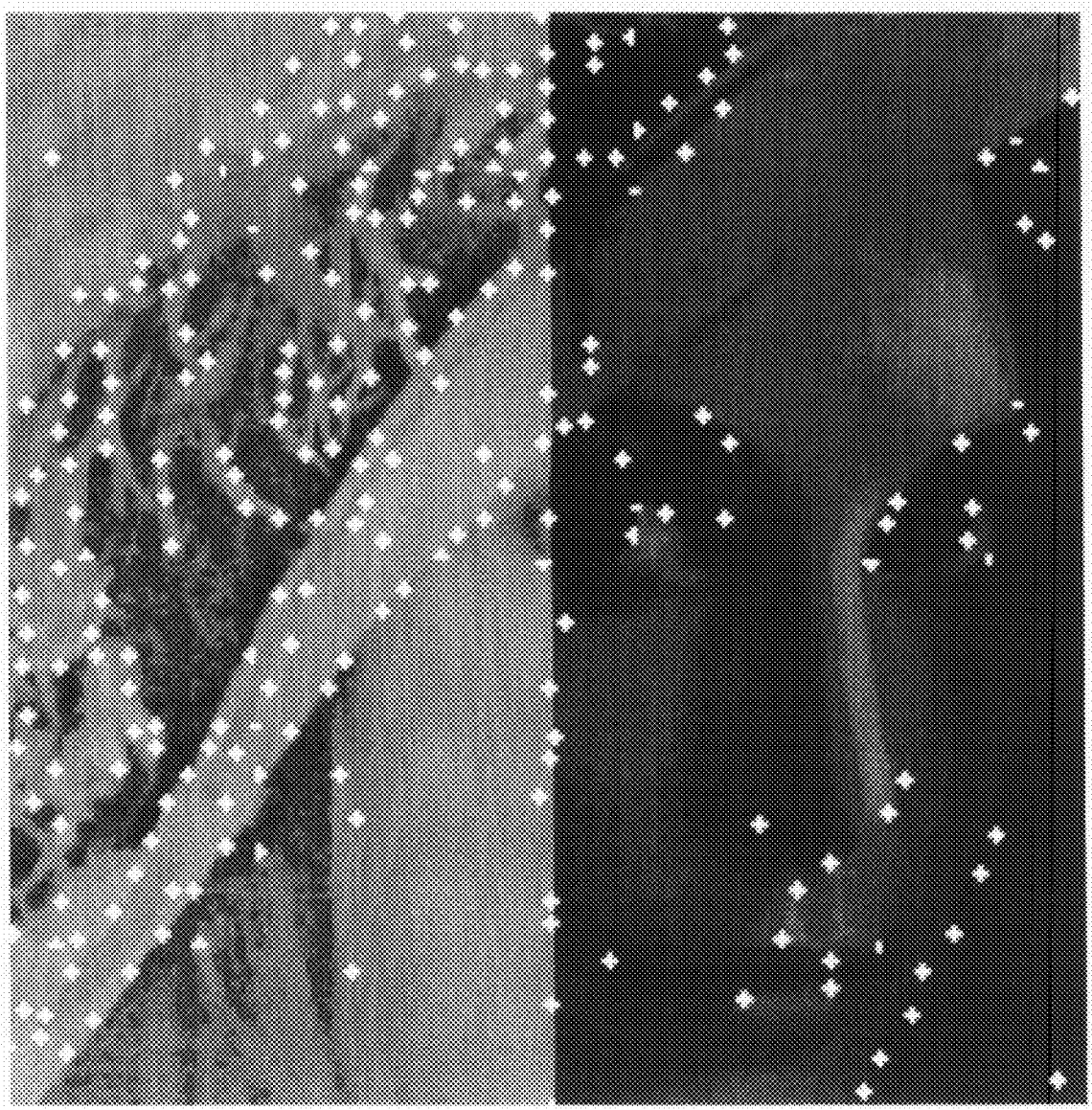
FIG. 15 is a result of a feature point detection process in an image processing method according to an embodiment of the invention.

The estimated noise amount σ can be also obtained not by the method described here but by any other operation using the absolute value |∇(θ+π/2)| of the primary spatial differential value in the direction perpendicular to the feature point direction; of which examples include but are not limited to the mean or mode. FIGS. 14 and 15 show examples of results of detection of feature points based on calculation of the feature point intensity P obtained as described above. FIG. 14 shows a result using a KLT method which is a related-art feature point detection method. FIG. 15 shows a result using the feature point detection method according to this embodiment.

In order to make the effect of the feature point detection method according to this embodiment understood easily, a feature point detection process was performed upon an image where the brightness value of each pixel in the right half of a current image was multiplied by the constant 0.5 so that the contrast was lowered.

Compare the feature point detection result in FIG. 14 with that in FIG. 15. There is a large difference between the results in the right halves of the images where the contrast was lowered. Due to the change in noise degree caused by the lowering of the contrast, feature points cannot be detected correctly in the related-art feature point detection method as shown in FIG. 15.

On the other hand, there is little influence of the change in contrast or the change in noise degree in the edge detection method according to this embodiment, but feature points can be detected correctly as shown in FIG. 15.

In addition, in the feature point detection method according to this embodiment, the feature point intensity is a value normalized by the edge intensity and the edge curvature. Further, the feature point intensity is a value where the influence of noise has been suppressed. Accordingly, the influence of a threshold value on determination of the existence of a feature point is reduced with comparison with that in the background art. In other words, it is easier to set the threshold value. The feature point intensity P of each pixel obtained as described above is compared with the threshold value. Thus, it is possible to determine whether each pixel is a feature point or not. Alternatively, a feature point intensity map which is an image using the feature point intensity P as a pixel value as it is, may be created. In this case, various processes are performed upon the feature point intensity map.

Modification 2

The aforementioned Expression (3) and Expression (4) show examples where the absolute value |∇(θ+π/2)| of the primary spatial differential value in the direction perpendicular to the feature point direction is used as the estimated noise amount σ. However, the absolute value |∇²θ| of the secondary spatial differential value in the feature point direction may be used as the estimated noise amount σ. That is, when |∇(θ+π/2)| in Expression (3) and Expression (4) is replaced by |∇²θ|, it is possible to obtain the estimated noise amount σ. Alternatively, an average of |∇(θ+π/2)| and |∇²θ| may be obtained by way of example. Arbitrary value obtained by use of both of the values |∇(θ+π/2)| and |∇²θ| may be used as the estimated noise amount σ.

The method for calculating the feature point intensity P is not limited to Expression (3), either. For example, first a value $P_1$ derived from the edge intensity and a value $P_2$ derived from the edge curvature may be calculated separately. For example, when one of the values $P_1$ and $P_2$ is beyond a predetermined threshold, the other value can be obtained, or to improve computation speed not obtained. Any value obtained by combination of a primary spatial differential value derived from edge intensity in a feature point, a secondary spatial differential value derived from an edge curvature in the feature point, and an estimated noise amount, may be used as the feature point intensity.

$$P_1 = \frac{\lfloor|\nabla\theta| - \alpha\sigma\rfloor}{|\nabla\theta|}$$ (5)

where $$\lfloor X \rfloor = \begin{cases} 0 & (X \leq 0) \\ X & (X > 0) \end{cases}$$

$$P_2 = \frac{\lfloor|\nabla^2(\theta + \frac{\pi}{2})| - \alpha\sigma\rfloor}{|\nabla^2(\theta + \frac{\pi}{2})|}$$ (6)

where $$\lfloor X \rfloor = \begin{cases} 0 & (X \leq 0) \\ X & (X > 0) \end{cases}$$

Modification 3

In this embodiment, description was made on the image processing method in which a brightness gradient value is obtained from the brightness values of a monochrome shaded image so as to detect a feature point. If spatial differential values are replaced by attribute spatial differential values, a similar feature point detection process can be performed on any image attribute value as shown below. For example, such attribute values may include the following values.

For example, when an input image is an RGB color image, element values of R (red), G (green) and B (blue) can be used as attribute values. A brightness value may be obtained from a linear sum of the R, G and B values. Alternatively, attribute values obtained by operation may be used.

Not only element values in the RGB color system but also element values in a Munsell color system such as hue H or saturation S can be used. Element values obtained in another generally known color system (XYZ, UCS, CMY, YIQ, Ostwald, L*u*v, L*a*b*, etc.) may be used likewise as attribute values. For example, a conversion system among the respective color systems is described in detail in the aforementioned document "A Combined Corner and Edge Detector". According to the transform of image element values, the noise variance should be also transformed.

Further, it can be also imagined that results obtaining differential operation or integral operation performed spatially or temporally upon an image are used as attribute values. Examples of operators that can be used in this operation include the aforementioned spatial differential operation, Laplacian Gaussian, moment operator, etc. Intensity as a result of applying any one of such operators to an image can be used as an attribute value. In using such values, the noise amount must be adjusted by the filter coefficients of the applied filter $\sigma_g^2 = \sigma_0^2 \Sigma |fi|^2$ where fi are the filter coefficients.

It is also conceivable to use a result of a noise elimination process such as an integral average filter or an integral median filter.

The operators and filters are also described in detail in the aforementioned document "A Combined Corner and Edge Detector".

Further, statistics that can be obtained for each pixel in a predetermined region in an image can be also used as attribute values. Examples of the statistics include a mean, a median, a mode, a range, a variance, a standard deviation, a mean deviation, etc.

These statistics may be obtained from eight pixels around a target pixel. Alternatively, a statistic obtained in a predetermined region having a desired shape may be used as an attribute value.

If a smoothing filter such as a Gaussian filter having a desired variance is applied before calculation of spatial differential values, the calculation of spatial differential values can be performed upon any image scale. Thus, accurate feature point detection can be performed upon an image having a desired scale.

Second Embodiment

Figure 16:
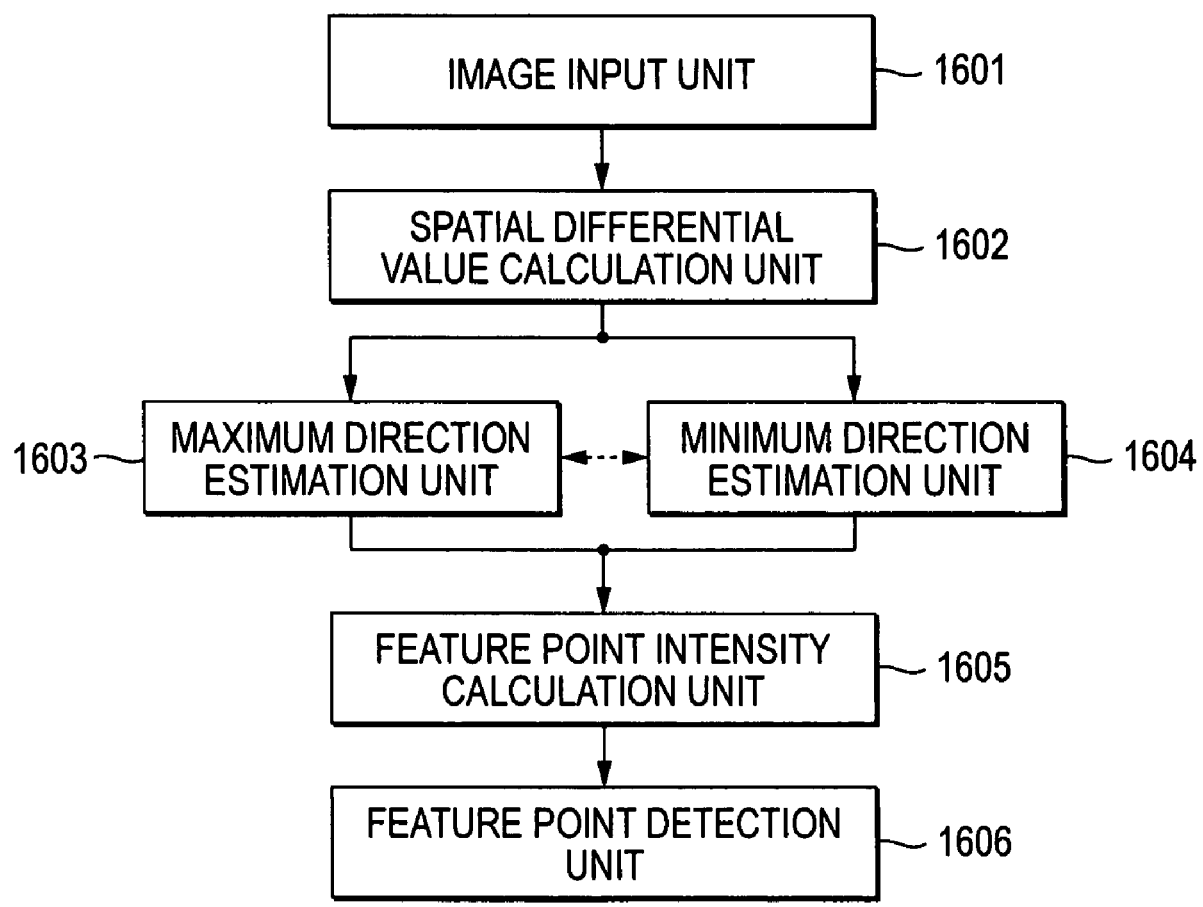
FIG. 16 is a block diagram of an image processing apparatus according to a second embodiment of the invention.

FIG. 16 is a block diagram of an image processing apparatus according to a second embodiment of the invention. The image processing apparatus according to this embodiment detects corner points as feature points from an input image.

The feature point detection apparatus according to this embodiment has an image input unit 1601 for inputting an image, a spatial differential value calculation unit 1602 for calculating primary spatial differential values and secondary spatial differential values in a plurality of directions in each pixel of the image, a maximum direction estimation unit 1603 for obtaining a direction where the absolute value of the primary spatial differential value is maximum, a minimum direction estimation unit 1604 for obtaining a direction where the absolute value of the obtained primary spatial differential value is minimum, and a feature point intensity calculation unit 1605 for calculating feature point intensity, or response, of each pixel. In addition, the feature point detection apparatus has a feature point detection unit 1606 for detecting a feature point from the image based on the feature point intensity of each pixel.

The image input unit 1601 inputs a still image or a moving image. When a moving image is input, the images are inputted sequentially as a single frame or field unit.

The spatial differential value calculation unit 1602 calculates primary spatial differential values and secondary spatial differential values in a plurality of directions for each pixel of the inputted image. The spatial differential value calculation unit 1602 according to this embodiment calculates primary spatial differential values and secondary spatial differential values in four directions, that is, the up/down direction, the left/right direction and two oblique directions with each pixel as a center. The primary spatial differential values and the secondary spatial differential values are calculated in the aforementioned manner, that is, by use of absolute values of differences between pixel values.

The spatial differential value calculation unit 1602 generates spatial differential information in which the primary spatial differential values, the second spatial differential values, the directions and the pixels are associated. The spatial differential information is supplied to the maximum value detection unit 1603 and the minimum value detection unit 1604.

The maximum direction estimation unit 1603 obtains a direction where the absolute value of the primary spatial differential value is maximum in each pixel. The minimum direction estimation unit 1604 obtains a direction where the absolute value of the primary spatial differential value is minimum in each pixel.

The feature point intensity calculation unit 1605 calculates feature point intensity of each pixel using the maximum value and the minimum value of the primary spatial differential values of the pixel, and the secondary spatial differential values in the same directions as the directions with which the aforementioned primary spatial differential values are calculated. The feature point intensity calculation unit 1605 first estimates the noise amount in each pixel in the aforementioned method using the minimum value of the primary spatial differential values. Then, the feature point intensity calculation unit 1605 calculates the feature point intensity of each pixel using the noise amount, the maximum value of the primary spatial differential values, and the secondary spatial differential value in a direction perpendicular to the direction of the maximum value of the primary spatial differential values. The feature point intensity calculation unit 1605 creates a feature point intensity map in which each pixel value is expressed by the calculated feature point intensity.

It may be necessary to detect feature points, for example, in order to determine the positions of the feature points in an image. In such a case, the feature point detection unit 1606 detects feature points in the image using the feature point intensity map, and creates a feature point map. The feature point map is a binary image expressing whether each pixel is a feature point or not. Specifically the feature point detection unit 1606 concludes that a pixel in question is a pixel of a feature point when the feature point intensity of the pixel is higher than a predetermined reference value. At the same time, the feature point detection unit 1606 sets a value expressing that that pixel is a feature point, into a corresponding pixel of the feature point map. The feature point map is, for example, an image as shown by white points in FIG. 15. The white points express pixels concluded to be feature points.

Modification 4

The minimum direction estimation unit 1604 may refer to a result of estimation by the maximum direction estimation unit 1603. That is, a direction perpendicular to a direction with which the primary spatial differential value is maximum may be estimated as a direction with which the primary spatial differential value is minimum.

The maximum direction estimation unit 1603 may refer to a result of estimation by the minimum direction estimation unit 1604. That is, a direction perpendicular to a direction with which the primary spatial differential value is minimum may be estimated as a direction with which the primary spatial differential value is maximum.

Third Embodiment

Figure 17:
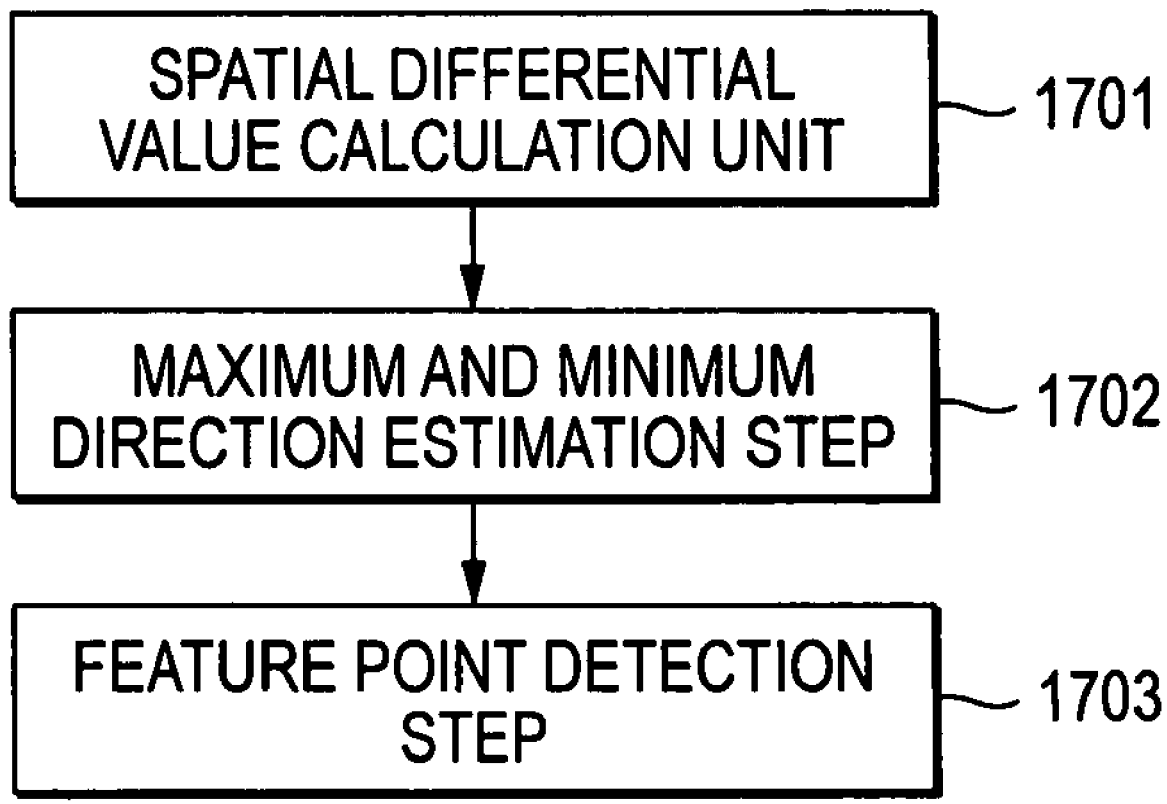
FIG. 17 is a flow chart of a feature point detection process in an image processing method according to a third embodiment of the invention.

An image processing method according to a third embodiment of the invention will be described. FIG. 17 is a flow chart of a feature point detection process using the image processing method according to this embodiment.

This feature point detection process includes a spatial differential value calculation step 1701, a maximum and minimum direction estimation step 1702 and a feature point detection step 1703.

The first and second embodiments were described on a method for detecting a large-curvature point (corner point) on an edge as a feature point. In the image processing method according to this embodiment, not only a point on an edge but also a center of a small region (for example, an isolated point or a region measuring 3 or less pixels by 3 or less pixels) can be detected as a feature point. Such a small region is characterized in that the absolute value of a primary spatial differential value is much smaller than the absolute value of a secondary spatial differential value.

Figure 18:
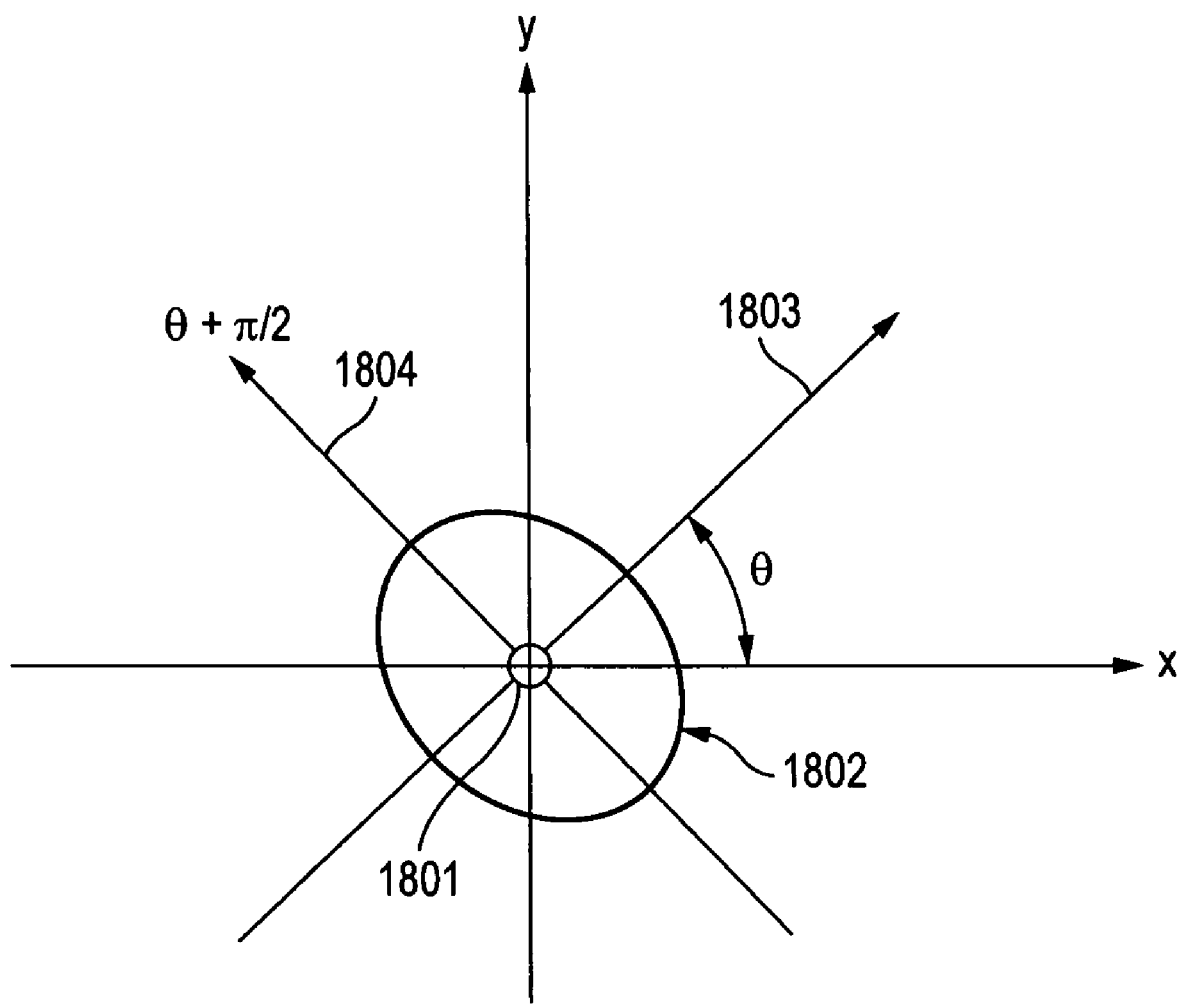
FIG. 18 is a schematic diagram showing an example of an edge and a feature point in an image region.
Figure 19:
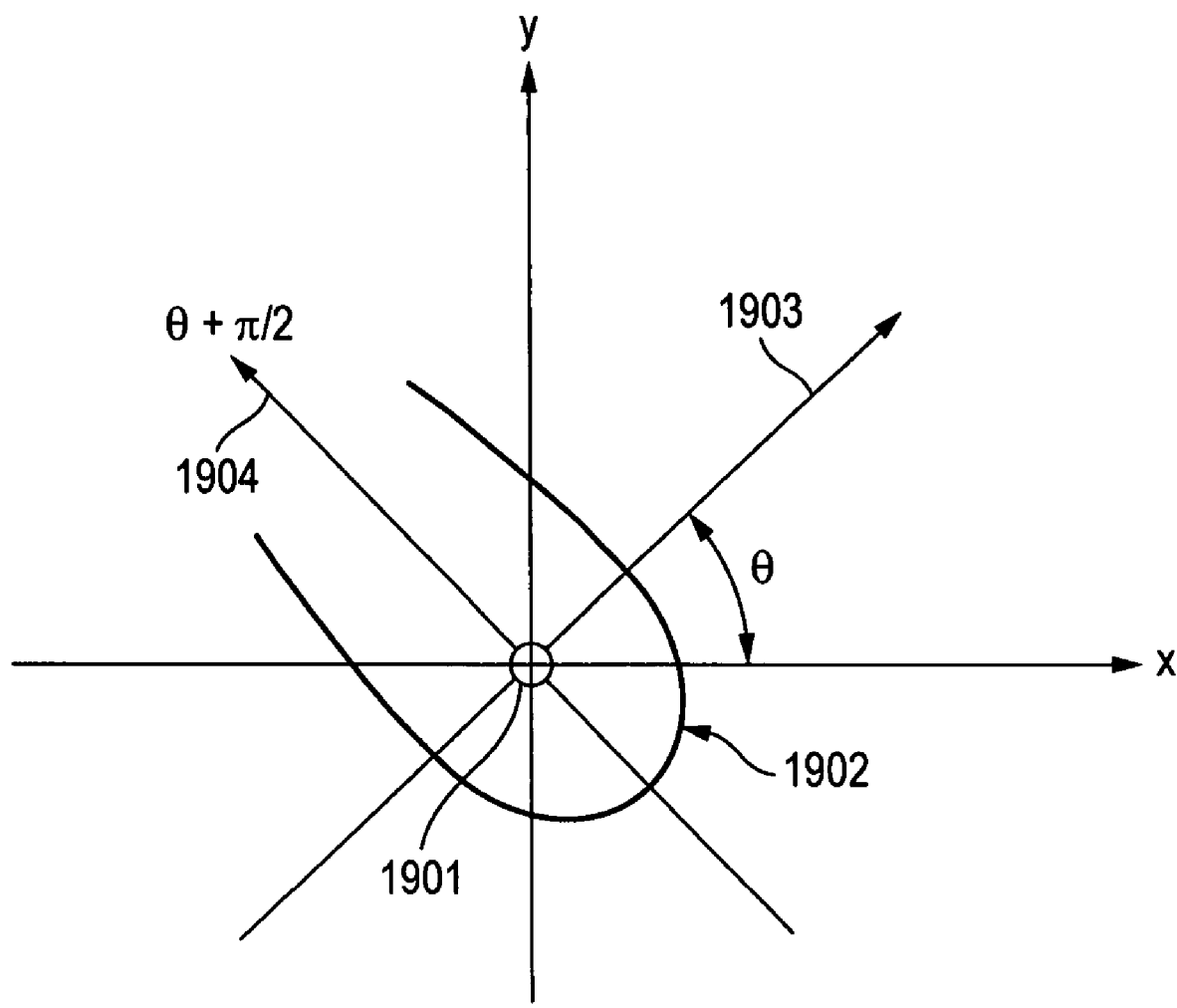
FIG. 19 is a schematic diagram showing an example of an edge and a feature point in an image region.

FIG. 18 shows an example where there is an elliptic image region around a pixel 1801, and an edge 1802 lies as a border of the image region.

When the brightness value of the image changes continuously near the edge 1802, the change of brightness in a minor axis 1803 of the elliptic image region can be expressed by the solid line 501, and the change of brightness in a major axis 1804 can be expressed by the broken line 502.

Accordingly, primary spatial differential values of the changes of brightness are obtained as shown by the solid line 601 and the broken line 602 respectively. Each of the primary spatial differential values is a small value close to zero near the pixel 1801.

Further secondary spatial differential values as shown by the solid line 801 are obtained in both the minor axis and the major axis in spite of differences in amplitude and spread. Near the pixel 1801, a secondary spatial differential value having a large absolute value can be obtained in accordance with the change of brightness in the elliptic image region.

Thus, the center of the image region can be detected as a feature point by the following operation.

In the spatial differential value calculation step 1701, the same spatial differential operation as in the spatial differential value calculation step 1 in the first embodiment is performed to calculate primary spatial differential values and secondary spatial differential values in a plurality of directions.

Next, in the maximum and minimum direction estimation step 1702, maximum and minimum directions for the secondary spatial differential values are obtained, an absolute value of a secondary spatial differential value in the maximum direction is obtained as $|\nabla^2\theta|$, and a secondary spatial differential value in the minimum direction is obtained as $|\nabla^2(\theta+\pi/2)|$, while primary spatial differential values in the maximum and minimum directions are obtained as $|\nabla\theta|$ and $|\nabla(\theta+\pi/2)|$ respectively.

Finally in the feature point detection step 1703, in the same manner as in Expression (3), an estimated noise amount σ is obtained as shown in Expression (7). By use of the estimated noise amount σ, feature point intensity P' can be obtained.

$$\sigma = E[|\nabla(\theta + \frac{\pi}{2})|] \quad (7)$$

$$P' = \frac{\lfloor|\nabla\theta| - \alpha\sigma\rfloor\lfloor|\nabla^2(\theta + \frac{\pi}{2})| - \alpha\sigma\rfloor}{|\nabla\theta||\nabla^2(\theta + \frac{\pi}{2})|}$$

where $$\lfloor X \rfloor = \begin{cases} 0 & (X \leq 0) \\ X & (X > 0) \end{cases}$$

Here, in the maximum and minimum direction estimation step 1702, only one of the maximum and minimum directions may be obtained in the same manner as in Modification 1-1 or 1-2 while a direction perpendicular thereto is set as the minimum or maximum direction. When the image has been quantized, processing can be simplified in the same manner as in Modification 1-3.

Also in the feature point detection step 1703, a neighborhood operation as shown in Expression (4) may be performed for calculating the estimated noise amount σ, or $|\nabla(\theta+\pi/2)|$ may be replaced by $|\nabla\theta|$. Any value obtained based on $|\nabla(\theta+\pi/2)|$ and $|\nabla\theta|$ can be used as the estimated noise amount σ.

Likewise it is obvious that the method for calculating the feature point intensity can be also changed as in Modifications 2 or 3.

Further, a to-be-detected image region around a feature point does not have to be closed as shown by the edge 1802, but may be an image region surrounded by an open edge on its one side as shown by an edge 1902. Even in this case, a direction 1903 with which the secondary spatial differential value is the maximum can be obtained for a pixel 1901 which is the pseudo-center of the image region. It is therefore possible to detect a point like the pixel 1901 as a feature point by the same operation as that in this embodiment.

That is, in the image processing method according to this embodiment, an isolated point, a small region or an edge tip portion in an image can be detected as a feature point.

The image processing method according to this embodiment can use the spatial differential values obtained in the image processing methods according to the first embodiment and the second embodiment, as they are. In combination of these methods, a plurality of different kinds of feature points can be detected by a smaller number of operations.

For example, feature point intensity of each pixel may be calculated as a vector quantity of values obtained according to the first and second embodiments and a value obtained according to the third embodiment. Whether each pixel is a feature point or not or what kind of feature point the pixel belongs to may be determined in accordance with the vector value.

What is claimed is:
1. An image processing apparatus for calculating an evaluated value for detecting a feature point in an image, the apparatus comprising a processor that executes:
   an image input unit for inputting an image;
   a spatial differential value calculation unit that calculates a primary spatial differential value of a brightness value and a secondary spatial differential value of the brightness value with respect to each of a plurality of directions in each pixel of the image;
   a maximum and minimum direction estimation unit that estimates a maximum direction and a minimum direction for each pixel, the maximum direction being a direction with which the primary spatial differential value is a maximum value, the minimum direction being a direction with which the primary spatial differential value is a minimum value;

an evaluated value calculation unit that calculates a first evaluated value of each pixel using the primary spatial differential value in the maximum direction in the pixel, the primary spatial differential value in the minimum direction in the pixel, and the secondary spatial differential value in the maximum direction in the pixel; and an output unit that outputs the first evaluated value of each pixel.

2. The apparatus according to claim 1, wherein the evaluated value calculation unit comprises:
a noise degree estimation unit that estimates a noise amount in each pixel using the primary spatial differential value in the minimum direction;
a temporary evaluated value calculation unit that calculates a temporary evaluated value using the primary spatial differential direction in the maximum direction and the secondary spatial differential value in the minimum direction; and
a normalization unit that normalizes the temporary evaluated value using the temporary evaluated value and the noise amount so as to calculate the first evaluated value.

3. The apparatus according to claim 2, wherein the noise degree estimation unit estimates the noise amount in each pixel using an average value of absolute values of primary spatial differential values in minimum directions in a plurality of pixels located within a predetermined range including the pixel in the image.

4. The apparatus according to claim 2, wherein the noise degree estimation unit estimates the noise amount in each pixel using an average value of secondary spatial differential values in maximum directions in a plurality of pixels located within a predetermined range including the pixel in the image.

5. The apparatus according to claim 1, wherein the evaluated value calculation unit comprises:
a noise degree estimation unit that estimates a noise amount in each pixel using the primary spatial differential value in the minimum direction; and
a temporary evaluated value calculation unit that calculates a first temporary evaluated value using the primary spatial differential direction in the maximum direction and the secondary spatial differential value in the minimum direction, the temporary evaluated value calculation unit calculating a second temporary evaluated value using a value obtained by subtracting the noise amount from the primary spatial differential value in the maximum direction and a value obtained by subtracting the noise amount from the secondary spatial differential value in the minimum direction, and
wherein the evaluated value calculation unit calculates the first evaluated value by dividing the second temporary evaluated value by the first temporary evaluated value.

6. The apparatus according to claim 5, wherein the noise degree estimation unit estimates the noise amount in each pixel using an average value of absolute values of primary spatial differential values in minimum directions in a plurality of pixels located within a predetermined range including the pixel in the image.

7. The apparatus according to claim 5, wherein the noise degree estimation unit estimates the noise amount in each pixel using an average value of secondary spatial differential values in maximum directions in a plurality of pixels located within a predetermined range including the pixel in the image.

8. The apparatus according to claim 1, wherein the maximum and minimum direction estimation unit estimates the maximum direction using the primary spatial differential values in two or more different directions, and determines a direction perpendicular to the maximum direction to be the minimum direction.

9. The apparatus according to claim 1, wherein the maximum and minimum direction estimation unit estimates the minimum direction using the primary spatial differential values in two or more different directions, and determines a direction perpendicular to the minimum direction to be the maximum direction.

10. The apparatus according to claim 1, wherein the maximum and minimum direction estimation unit estimates a secondary differential maximum direction and a secondary differential minimum direction in each pixel, the secondary differential maximum direction being a direction with which the secondary spatial differential value is a maximum value, a secondary differential minimum direction being a direction with which the secondary spatial differential value is a minimum value,
wherein the evaluated value calculation unit calculates a second evaluated value of each pixel using the secondary spatial differential value in the secondary differential maximum direction in the pixel, the secondary spatial differential value in the secondary differential minimum direction in the pixel, and the minimum value of the primary spatial differential value in the pixel, and
wherein the output unit also outputs the second evaluated value of each pixel.

11. An image processing method for calculating an evaluated value for detecting a feature point in an image, the method comprising:
inputting an image;
calculating, by a processor, a primary spatial differential value of a brightness value and a secondary spatial differential value of the brightness value with respect to each of a plurality of directions in each pixel of the image;
estimating, by the processor, a maximum direction and a minimum direction for each pixel, the maximum direction being a direction with which the primary spatial differential value is a maximum value, the minimum direction being a direction with which the primary spatial differential value is a minimum value;
calculating, by the processor, a first evaluated value of each pixel using the primary spatial differential value in the maximum direction in the pixel, the primary spatial differential value in the minimum direction in the pixel, and the secondary spatial differential value in the maximum direction in the pixel; and
outputting the first evaluated value of each pixel.

12. A non-transitory computer-readable medium that stores a computer program for causing a computer to perform a process for calculating an evaluated value for detecting a feature point in an image, the process comprising:
inputting an image;
calculating a primary spatial differential value of a brightness value and a secondary spatial differential value of the brightness value with respect to each of a plurality of directions in each pixel of the image;
estimating a maximum direction and a minimum direction for each pixel, the maximum direction being a direction with which the primary spatial differential value is a maximum value, the minimum direction being a direction with which the primary spatial differential value is a minimum value;
calculating a first evaluated value of each pixel using the primary spatial differential value in the maximum direction in the pixel, the primary spatial differential value in the minimum direction in the pixel, and the secondary spatial differential value in the maximum direction in the pixel; and
outputting the first evaluated value of each pixel.

13. An image processing apparatus for calculating an evaluated value for detecting a feature point in an image, the apparatus comprising a processor that executes:
- an image input unit for inputting an image;
- a spatial differential value calculation unit that calculates a primary spatial differential value of a brightness value and a secondary spatial differential value of the brightness value with respect to each of a plurality of directions in each pixel of the image;
- a maximum and minimum direction estimation unit that estimates a maximum direction and a minimum direction for each pixel, the maximum direction being a direction with which the secondary spatial differential value is a maximum value, the minimum direction being a direction with which the secondary spatial differential value is a minimum value;
- an evaluated value calculation unit that calculates an evaluated value of each pixel using the secondary spatial differential value in the maximum direction in the pixel, the secondary spatial differential value in the minimum direction in the pixel, and the primary spatial differential value in the maximum direction in the pixel; and
- an output unit that outputs the evaluated value of each pixel.

14. The apparatus according to claim 13, wherein the evaluated value calculation unit comprises:
- a noise degree estimation unit that estimates a noise amount in each pixel using the minimum value of the primary spatial differential value; and
- a temporary evaluated value calculation unit that calculates a first temporary evaluated value using the secondary spatial differential value in the secondary differential maximum direction and the secondary spatial differential value in the minimum direction, and calculates a second temporary evaluated value using a value obtained by subtracting the noise amount from the secondary differential value in the secondary differential maximum direction and a value obtained by subtracting the noise amount from the secondary spatial differential value in the minimum direction, and
- wherein the evaluated value calculation unit calculates the evaluated value by dividing the second temporary evaluated value by the first temporary evaluated value.

15. An image processing method for calculating an evaluated value for detecting a feature point in an image, the method comprising:
- inputting an image;
- calculating, by a processor, a primary spatial differential value of a brightness value and a secondary spatial differential value of the brightness value with respect to each of a plurality of directions in each pixel of the image;
- estimating, by the processor, a maximum direction and a minimum direction for each pixel, the maximum direction being a direction with which the secondary spatial differential value is a maximum value, the minimum direction being a direction with which the secondary spatial differential value is a minimum value;
- calculating, by the processor, an evaluated value of each pixel using the secondary spatial differential value in the maximum direction in the pixel, the secondary spatial differential value in the minimum direction in the pixel, and the primary spatial differential value in the maximum direction in the pixel; and
- outputting the evaluated value of each pixel.

16. A non-transitory computer-readable medium that stores a computer program for causing a computer to perform a process for calculating an evaluated value for detecting a feature point in an image, the process comprising:
- inputting an image;
- calculating a primary spatial differential value of a brightness value and a secondary spatial differential value of the brightness value with respect to each of a plurality of directions in each pixel of the image;
- estimating a maximum direction and a minimum direction for each pixel, the maximum direction being a direction with which the secondary spatial differential value is a maximum value, the minimum direction being a direction with which the secondary spatial differential value is a minimum value;
- calculating an evaluated value of each pixel using the secondary spatial differential value in the maximum direction in the pixel, the secondary spatial differential value in the minimum direction in the pixel, and the primary spatial differential value in the maximum direction in the pixel; and
- outputting the evaluated value of each pixel.

* * * * *